United States Patent
Birch et al.

(10) Patent No.: US 10,112,700 B1
(45) Date of Patent: Oct. 30, 2018

(54) MULTI-MODE MOBILITY MICRO AIR VEHICLE

(75) Inventors: Matthew C. Birch, Painesville, OH (US); Richard Kolacinski, Merrimack, NH (US)

(73) Assignee: Orbital Research Inc., Cleveland, OH (US)

( * ) Notice: Subject to any disclaimer, the term of this patent is extended or adjusted under 35 U.S.C. 154(b) by 1684 days.

(21) Appl. No.: 13/185,508

(22) Filed: Jul. 19, 2011

Related U.S. Application Data

(60) Provisional application No. 61/367,155, filed on Jul. 23, 2010.

(51) Int. Cl.
| | |
|---|---|
| B64C 25/10 | (2006.01) |
| B64C 25/14 | (2006.01) |
| B64C 29/02 | (2006.01) |
| B64C 25/52 | (2006.01) |
| B64F 1/06 | (2006.01) |
| B64F 1/02 | (2006.01) |
| B64C 25/12 | (2006.01) |

(52) U.S. Cl.
CPC ............. *B64C 25/14* (2013.01); *B64C 25/10* (2013.01); *B64C 25/52* (2013.01); *B64C 29/02* (2013.01); *B64F 1/02* (2013.01); *B64F 1/06* (2013.01); *B64C 2025/125* (2013.01)

(58) Field of Classification Search
CPC ......... B64C 25/14; B64C 29/02; B64C 25/10; B64C 2025/125; B64C 25/52; B64C 25/00; B64F 1/06; B64F 1/02
USPC .... 244/7 B, 63, 100 R, 102 R, 110 E, 110 R, 244/108; 446/34, 36, 55
See application file for complete search history.

(56) References Cited

U.S. PATENT DOCUMENTS

| | | | | | |
|---|---|---|---|---|---|
| 2,534,962 | A | * | 12/1950 | Flurscheim | ............... 244/102 R |
| 5,086,993 | A | * | 2/1992 | Wainfan | ........................ 244/48 |
| 6,588,701 | B2 | * | 7/2003 | Yavnai | ........................ 244/23 A |
| 7,032,861 | B2 | * | 4/2006 | Sanders et al. | ............. 244/23 A |

(Continued)

OTHER PUBLICATIONS

Young et al. Rotorcraft as Mars Scouts (RMS), 2002, IEEE, p. 1-374.*

(Continued)

*Primary Examiner* — Assres H Woldemaryam
(74) *Attorney, Agent, or Firm* — Brian Kolkowski

(57) ABSTRACT

A multi-mode mobility micro air vehicle (MAV) accomplishes ground locomotion by hopping on a retractable leg. The hopping is translated into forward locomotion when aided by the forward thrust of propellers, and the orientation of locomotion is directed by aerodynamic controls like ailerons, rudders, stabilators, or plasma actuators. The foot of the leg is convexly curved so as to produce hopping that is statically and passively dynamically stable. The MAV is also equipped for vertical takeoff so that it may conduct multiple idling missions in sequence and may return home for recovery and reuse. Structural integration of power storage and photovoltaic generation systems into the aerodynamic surface of the MAV lightens the weight of the MAV while also providing a strong structure and permitting the MAV to harvest its own energy. The MAV may autonomously conduct surveillance missions and/or serve as a flying platform for self-healing sensor or communications networks, especially when multiple MAVs are used in concert.

20 Claims, 24 Drawing Sheets

(56) References Cited

U.S. PATENT DOCUMENTS

| | | | |
|---|---|---|---|
| 7,150,938 B2 * | 12/2006 | Munshi et al. | 429/162 |
| 7,249,732 B2 * | 7/2007 | Sanders et al. | 244/23 A |
| 8,091,836 B2 * | 1/2012 | Minick | 244/205 |
| 2002/0005457 A1 * | 1/2002 | Lee et al. | 244/30 |
| 2002/0060267 A1 * | 5/2002 | Yavnai | 244/23 A |
| 2003/0094537 A1 * | 5/2003 | Austen-Brown | 244/7 R |
| 2007/0034738 A1 * | 2/2007 | Sanders et al. | 244/23 A |
| 2009/0159754 A1 * | 6/2009 | Minick | 244/205 |
| 2009/0212164 A1 * | 8/2009 | Osborne et al. | 244/205 |
| 2010/0129203 A1 * | 5/2010 | Murray et al. | 415/119 |

OTHER PUBLICATIONS

Degner et al. The Lunar Hopping Transporter (LHT), Jul. 1971, NASA, p. 27, 22.*

"Hovering" Marriam-Webster Online Dictionary and Thesaurus, retrieved Jan. 27, 2014 from http://www.merriam-webster.com/dictionary/hovering.*

Fiorini et al, 'The Development of Hopping Capabilities for Small Robots', Autonomous Robots, 2003.*

Bellingham "Receding Horizon Control of Autonomous Aerial Vehicles", MIT, 2002.*

Mohammad Sadraey, "Landing Gear Design", Daniel Webster College, pp. 21-23.*

* cited by examiner

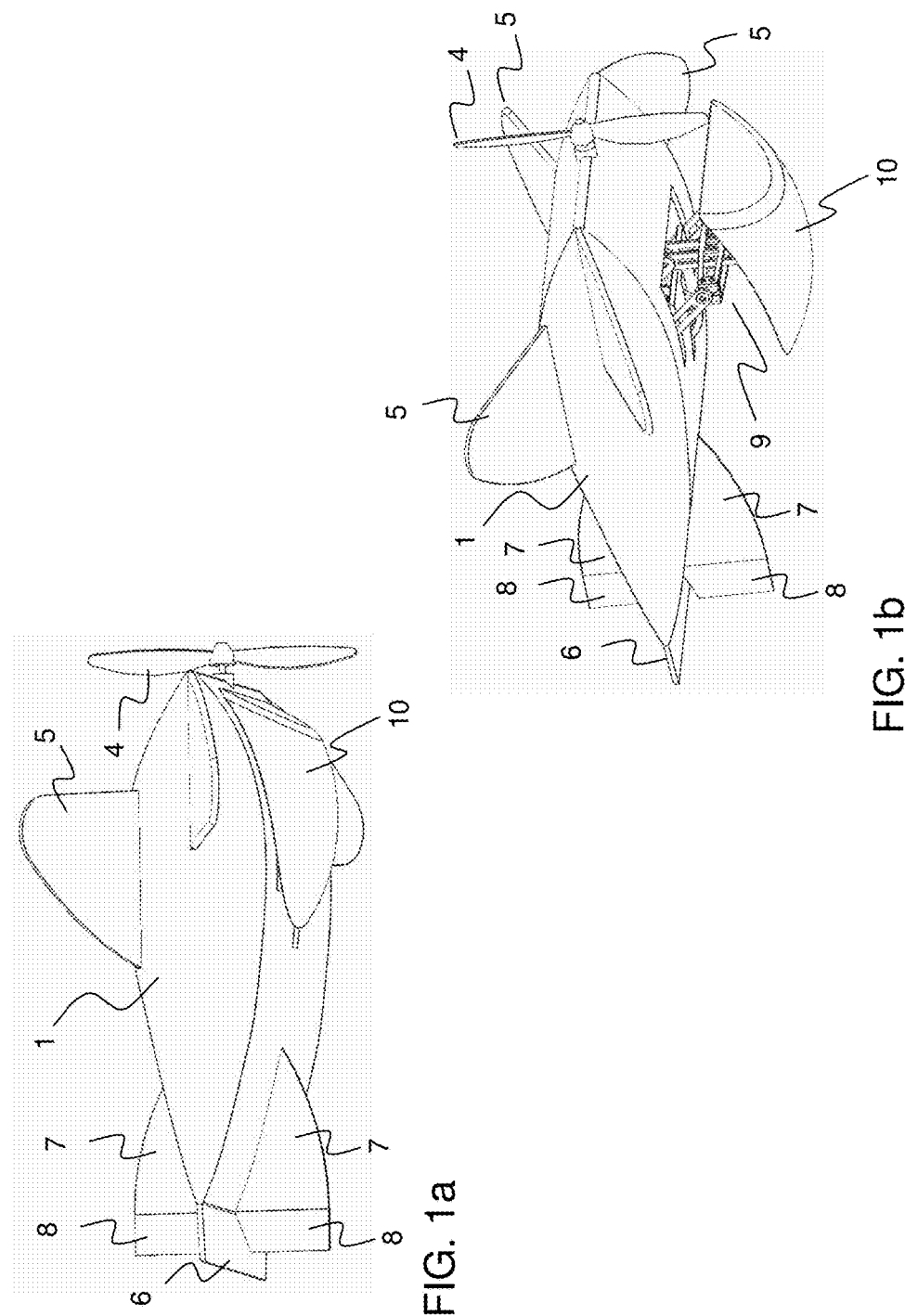

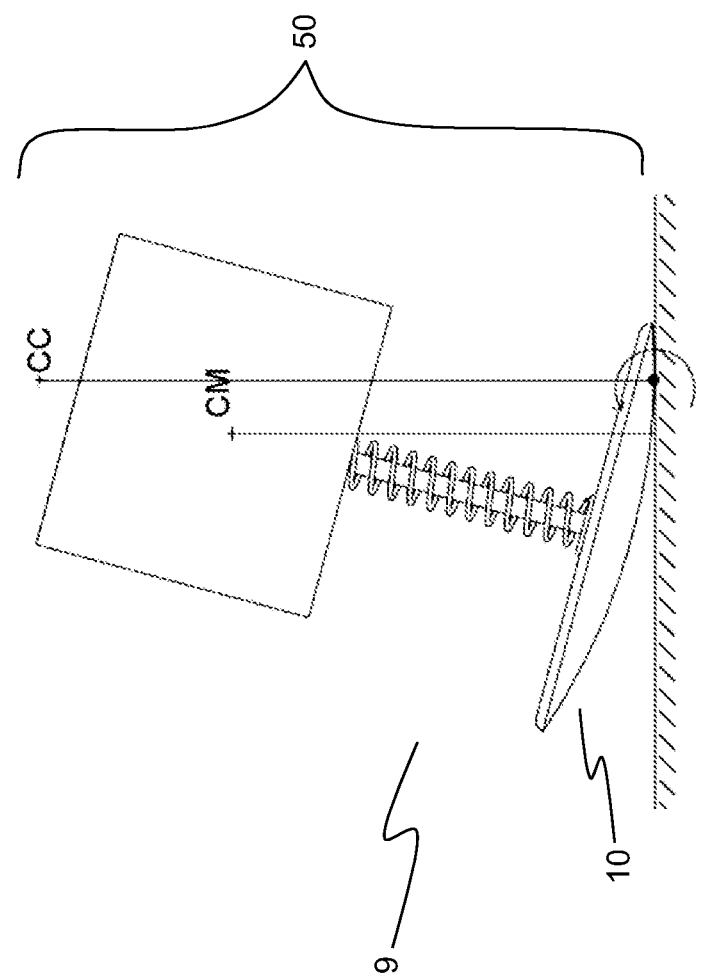

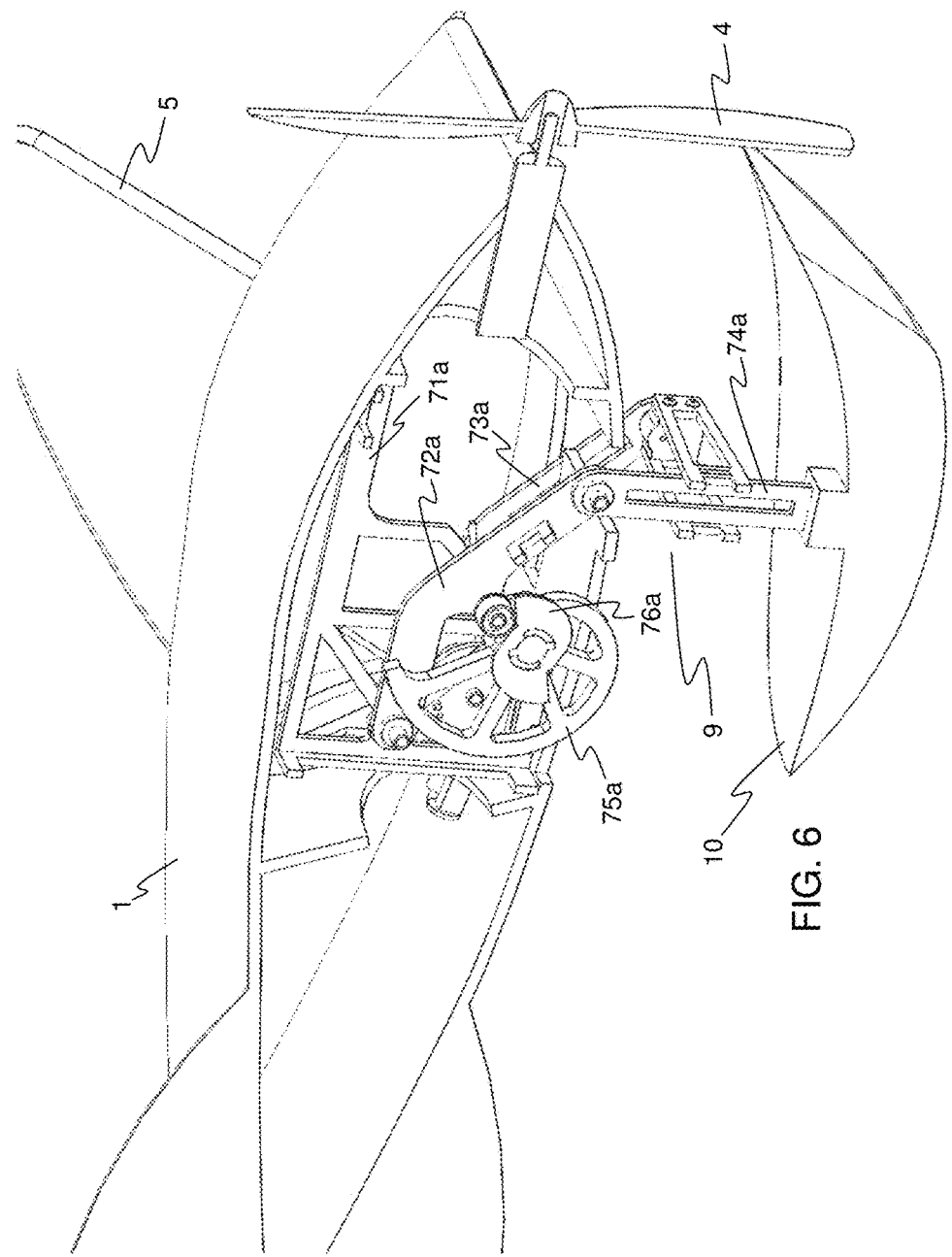

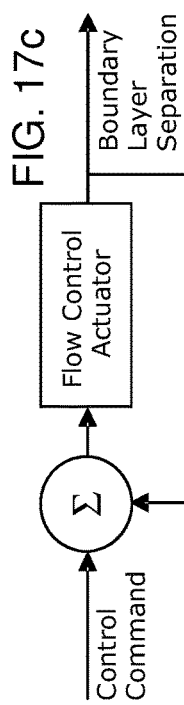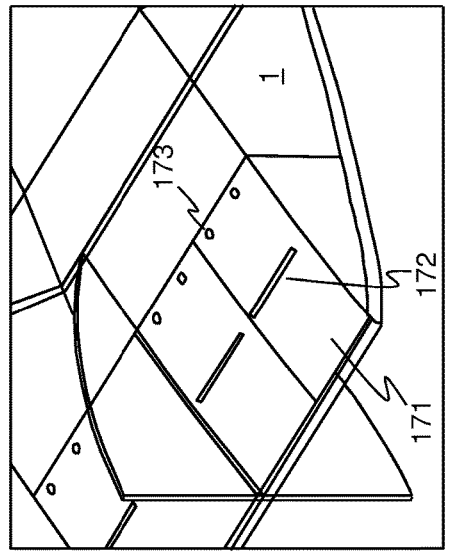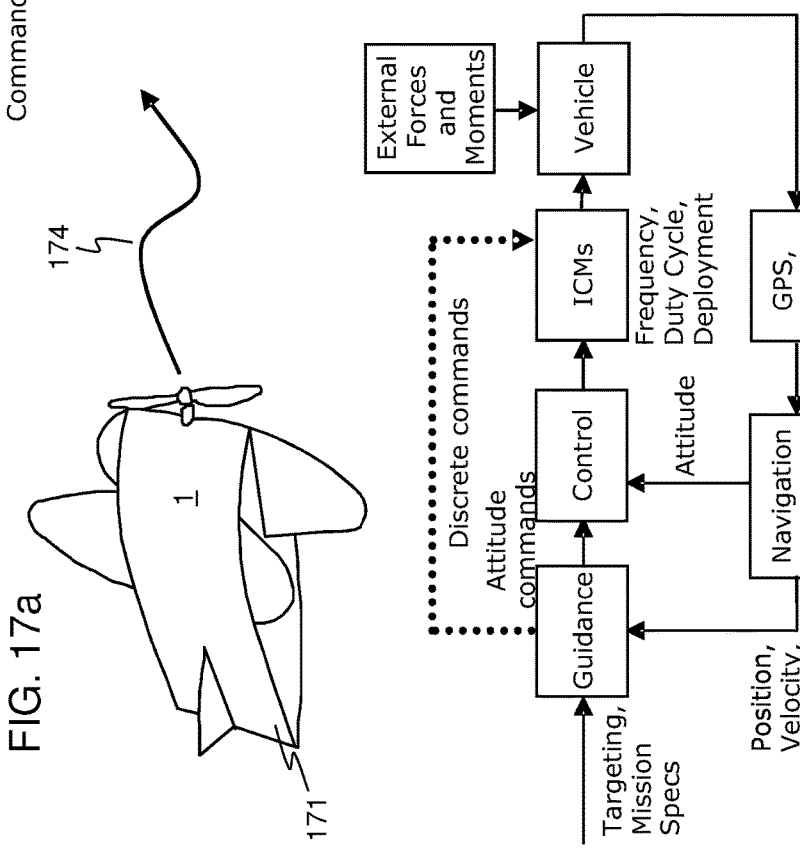
FIG. 17c
FIG. 17d
FIG. 17a
FIG. 17b

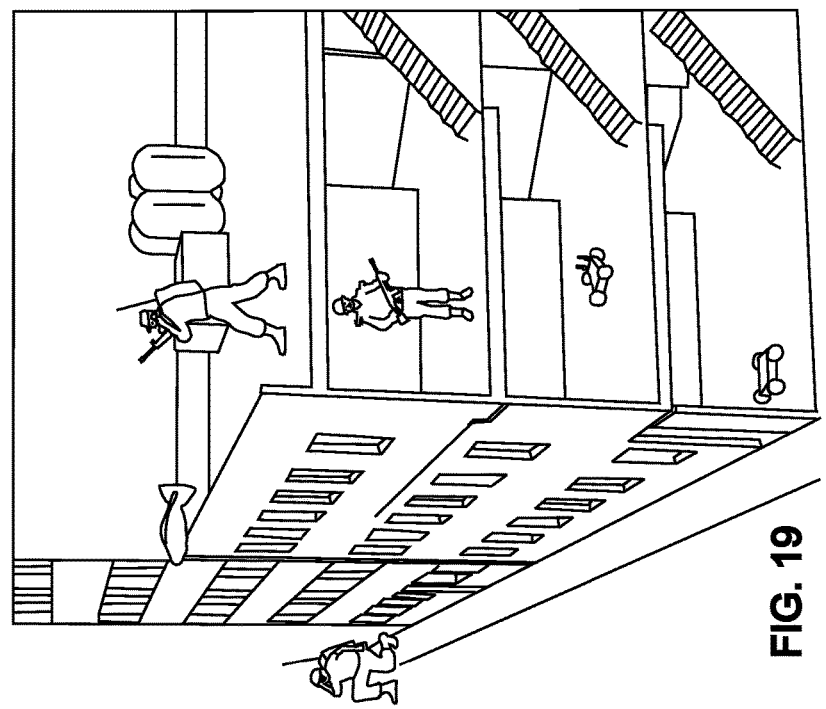
FIG. 19
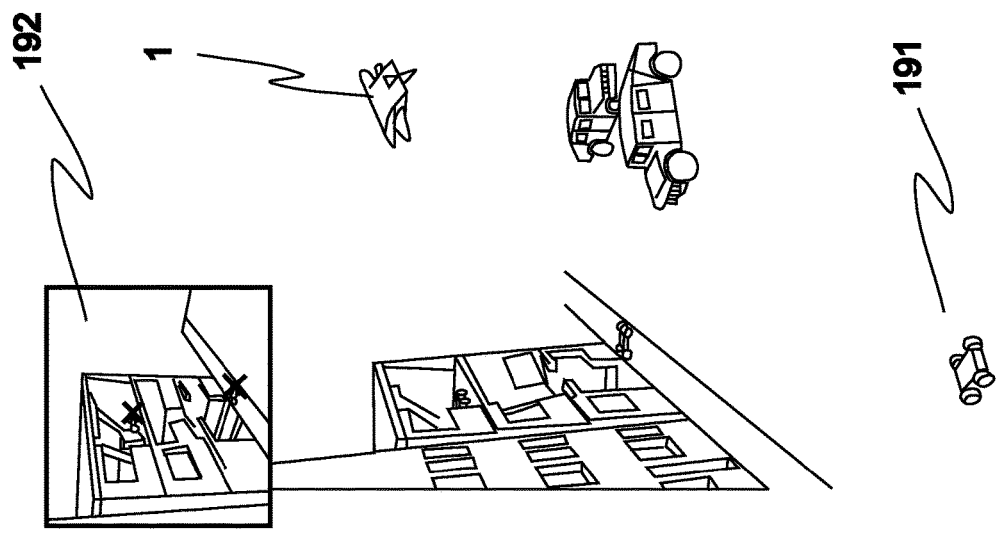

MULTI-MODE MOBILITY MICRO AIR VEHICLE

CROSS-REFERENCE TO RELATED APPLICATIONS

This application claims priority from U.S. Provisional Patent Application 61/367,155 filed Jul. 23, 2010.

STATEMENT REGARDING FEDERALLY-SPONSORED RESEARCH OR DEVELOPMENT

The U.S. Government has a paid-up license in this invention and the right in limited circumstances to require the patent owner to license others on reasonable terms provided for by the terms of U.S. Air Force contract Nos. FA8650-07-M-3731, FA8651-04-C-0252, and FA8651-05-C-0110.

BACKGROUND OF THE INVENTION

(1) Field of the Invention

The present invention relates to micro air vehicles used for surveillance, data collection, wireless communications networks, and other tasks. The present invention further relates to multi-mode mobility micro air vehicles and robots capable of both aerial maneuvering and terrestrial locomotion. The present invention further relates to methods and apparatuses for improved multi-mode mobility micro air vehicles with special features.

(2) Description of Related Art

Micro air vehicles (MAVs) are those unmanned air vehicles (UAVs) restricted by size and weight. Precise definitions of MAVs in the existing literature vary, but for the purposes of this application, a MAV is any UAV with no dimension of width, height, or length larger than approximately 16 inches, such that a MAV could be easily picked up and carried by an individual human being and transported in a backpack or briefcase without requiring significant disassembly (for example, without requiring removal of wings, propeller, landing gear or other flight structures). MAVs usually find use in aerial reconnaissance, surveying, mapping, urban security/crime fighting, traffic observation and the like, and as such, the principal mission payload of a MAV is typically a camera or other such sensor; however, MAVs can also be weaponized with payloads of high explosives, projectile weapons, or systems capable of generating electromagnetic pulses to disable electronic equipment used in communications, transport, sensor systems, weapons systems, etc.

Modern military activities put heightened demands on the intelligence-gathering communities to provide real-time information to the mission commanders. Street-to-street fighting against guerilla fighters using asymmetrical warfare techniques has supplanted older warfare methods involving pitched battles against standing armies. In these situations, accurate, real-time information is critical for mission success and force protection. A UAV provides a multidimensional asset capable of accomplishing intelligence-gathering tasks without risking personnel or capital assets; MAVs are the next generation in real-time information reconnaissance for both rural and urban theaters of operation.

Starting in the late 2000s, miniature UAVs began seeing regular field duty with U.S. military forces. The AeroVironment RQ-11 Raven is the most widely deployed miniature UAV in service to date. However, existing miniature UAVs or MAVs are generally limited to a single mode of mobility, i.e., aerial flight, and cannot perform tasks that require, for example, landing, perching, moving around on a surface to assume a better position, remaining idle for a period of time, and then taking off again.

Multi-mode mobility MAVs are those MAVs which are equipped not just for flight but also for another mode of mobility, such as terrestrial locomotion or travel in the water as a floating or submersible craft. Multi-mode mobility can convey advantages of energy efficiency, stealth operation and mission versatility by virtue of a multi-mode mobility vehicle's abilities to, for example, take cover out of sight, sit in wait for extended periods of still observation or communication before taking off again for vehicle recovery, and negotiate openings and obstacles in ways not performable by flying craft. A variety of systems have been used for ground locomotion in MAVs, such as wheels, tracks, legs, and wheel-leg combinations ("Whegs"), however, all of the existing systems have their disadvantages. For example, wheeled vehicles perform poorly on surfaces that are not flat and smooth, and generally cannot surmount obstacles larger than about $\frac{1}{3}$ of the wheel diameter since the wheels cannot get enough traction on the obstacle. At present miniaturized track systems do not confer any substantial advantage over wheels. Whegs, abstracted from biological systems of legged insects, are capable of surmounting larger obstacles but tend to be tangled up in fine obstacles such as wire, grass and weeds. Moreover, existing systems do not solve the "mobility mode transition problem" by providing systems capable of easily and safely transitioning from flight mode to ground locomotion mode and back.

Current UAVs and MAVs in development have flight speeds in excess of 30 mph; this leaves very little room for mistakes, and does not allow continual surveillance of a stationary target to be obtained. Unmanned ground vehicles (UGVs), or ground robots, are currently more suited for performing tasks inside of buildings, alleyways, and most urban terrain. Unfortunately, these vehicles are limited in their ability to reach many regions of interest due to inherent constraints on the types of terrain and kinds of obstacles they can navigate. There currently exists no MAV that will fly in to a target area, transition from flight to ground mobility, then transition back to flight for relocation or return to base.

What is needed, therefore, is a micro air vehicle system capable of landing and performing ground locomotion to position itself using a novel ground locomotive system. What is further needed is a MAV that could resume flight via vertical takeoff after having landed. What is further needed is a MAV capable of generating its own power in the interim while idling, while still maintaining a low weight and high structural strength. The combination of these various features results in a MAV-based sensor platform or communications platform that is capable of indefinite perch-and-stare missions or self-insertion into radio repeater networks.

BRIEF SUMMARY OF THE INVENTION

The present invention relates to robotic systems capable of multi-mode mobility. The present invention further relates to micro air vehicles capable of terrestrial locomotion in addition to aerial flight. The device of the present invention is small, portable, versatile, power-efficient, and able to address the reconnaissance, surveillance, observation, monitoring and communication requirements of multiple mission scenarios.

Preferably, the MAV of the present invention is single-soldier man-packable, meaning when not in use it can easily be stowed in a backpack or case and easily carried about by a single person (without any strain of heavy lifting). In most cases it would be desirable to pack the MAV in a protective hard shell case having a fitted shock-absorbent interior, as of foam, in order to prevent damage to the MAV during transport.

Preferably, the MAV has a large payload volume, which is to say its airframe construction should allow for various payload components to be placed within it or removed for mission customizability, unlike some types of MAVs that employ skeletal airframes, such as those inspired by insect, bat or bird body types. Further preferably, the airframe of the MAV has a payload interior of at least 60 cubic centimeters. In some instances, preferably, the airframe of the MAV has a payload interior of at least 1,640 cubic centimeters. In other instances, preferably, the airframe of the MAV has a payload interior of at least 3,930 cubic centimeters.

Preferably, the MAV of the present invention is capable of carrying a large payload capacity. Preferably, the MAV is capable of carrying at least 10% of gross vehicle weight as payload. More preferably, the MAV is capable of carrying at least 18% of gross vehicle weight as payload. Even more preferably; the MAV is capable of carrying at least 25% of gross vehicle weight as payload. Preferably, the MAV is capable of carrying a payload of at least 40 grams. More preferably, the MAV is capable of carrying a payload of at least 90 grams. Even more preferably, the MAV is capable of carrying a payload of at least 150 grams.

Preferably, the MAV of the present invention is capable of either hand or autonomous launch. In hand launch, a person holds the MAV with its propeller correctly oriented, makes a running start if necessary, and gives the MAV the required airspeed for flight before letting go. In autonomous launch, the MAV takes to the air without human intervention. This can in certain cases be accomplished by the MAV ground-locomoting itself off of a high surface upon which it has been perched, such as the roof of a multi-story building, using gravity to pick up enough airspeed to generate sufficient lift for flight and pulling out of the freefall dive. More preferably, however, this is accomplished by vertical takeoff, i.e., by the MAV first orienting itself with its propulsion systems oriented upward and generating sufficient thrust to lift the entire weight of the MAV into the air. With regards to recovery methods, preferably the MAV is capable of either a horizontal landing or a vertical landing in which its descent is slowed by its propulsion system.

Preferably, the MAV of the present invention is capable of autonomous flight. Preferably, it uses onboard sensors such as GPS, IMU, an altimeter, a magnetometer, and/or an airspeed sensor to feed an autopilot. However, in many instances it is also preferable for the MAV to be remote controlled by a human or computer operator, and therefore the MAV should alternatively or additionally have components for receiving control signals and actuating its propulsion, control, and payload systems appropriately. In some cases, preferably, the ground station interface is simple and can either be a typical radio control as found with hobbyist miniature planes or can be implemented in software to be controlled by a PC including a laptop PC, a tablet PC, a PDA or smartphone type device, a wristwatch control, etc.

Preferably, the MAV of the present invention has a communication range of 3-6 kilometers, line of sight with base station or remote controller. Flight range is dictated by endurance and cruise velocity.

Preferably, the MAV of the present invention has a high endurance. Preferably, the MAV is capable of at least 25 minutes of flight and 35 minutes of ground locomotion without recharging. More preferably, the MAV is capable of at least 1 hour of flight without recharging. More preferably still, the MAV is capable of at least three hours of flight without recharging. Also preferably, the MAV is capable of indefinite perch and stare operation and can harvest enough energy to operate its sensor systems and/or communications systems for the duration of its mission.

For this purpose, preferably the MAV of the present invention is equipped with an energy harvesting system and further preferably this energy harvesting system in part comprises structurally integrated lithium batteries and further preferably also comprises structurally integrated photovoltaic cells for electric power generation. Methods and systems for energy harvesting are discussed in greater detail below.

Preferably, the MAV of the present invention is capable of flying at speeds in the range of 5-45 kilometers per hour, and in ground locomotion mode travels at speeds of 0 to 0.5 meters per second. It is preferable that the MAV has the ability to fly at low speeds of at least 10 kilometers per hour for slow flight in congested environments such as at street level urban flight. More preferable would be the capability for flight at speeds as low as 5 kilometers per hour. More preferable still would be the ability to transition to full control hover for such congested environments. It is preferred to have a spring speed of at least 35 kilometers per hour for fast ingress and egress from a mission area and to fly into prevailing winds. More preferable would be speeds as high as 45 kilometers per hour and still more preferable speeds of 60 kilometers per hour would increase wind conditions in which the vehicle could operate effectively.

Preferably, the MAV of the present invention is capable of operating at altitudes from ground level to at least 1,500 feet above ground.

Typical embodiments of the MAV of the present invention have dimensions of about 30 centimeters (span) by about 30 centimeters (length) and are about 260 grams in mass depending on configuration.

By contrast, the AeroVironment Wasp Block III has a length of about 38 centimeters and a wingspan of about 72 centimeters, flies at speeds of 40 to 65 kilometers per hour, and has a mass of 430 grams.

Preferably the airframe of the MAV of the present invention is of a very small size and is aerodynamically designed to have a low stall speed and be capable of simple stable flight. Further preferably the airframe is capable of carrying payloads required for its mission, e.g., sensors and wireless communications equipment, payloads required for its locomotion and power, and optionally payloads for its self-preservation, each of which are described in greater depth below.

In a number of embodiments the multi-mode MAV of the present invention relies upon conventional wing-borne flight and transforms to legged locomotion on the ground. This design utilizes many of the vehicle's flight systems and components in a simple legged locomotion scheme based upon hopping. By properly shaping a hopping foot and properly positioning a hopping leg relative to the vehicle's center of mass, the vehicle is made passively stable, both statically during perching, and dynamically during hopping locomotion. Rather than relying upon a complicated mechanism or control system, a simple, one degree of freedom, passively stable hopping mechanism is utilized in order to effectively embed the desired behavior within the mechanism's dynamics. This passively stable hopping motion, combined with the vehicle's existing flight propulsion and control surfaces, creates a robust and effective ground locomotion mode. The passively stable hopping motion of the vehicle provides the means to navigate terrain while the flight propulsion system provides the forward locomotion and the MAV's yaw controls provide steering. The passive stability properties of the hopping mechanism prevent the destabilizing of the system either by the vehicle propulsion system or environmental disturbances. In essence, the hopping motion allows the vehicle to "fly" along the ground at velocities significantly below the stall speed of the lifting body airframe and permit the vehicle to stop forward progress and perch as necessary.

The use of a passively stabilized locomotion mechanism greatly reduces the need for a complex vehicle control system and hence reduces the need for onboard computing power. The locomotion scheme also relies heavily upon existing actuation and propulsion systems, reducing the gross weight of the vehicle (and thereby greatly reducing the vehicle power requirements) and making far more efficient use of the limited payload volume available within such a small flying vehicle than other comparable locomotion mechanisms.

A typical mission for the MAV of the present invention might be an extended "perch-and-stare" type mission wherein a MAV flies to a location advantageous for surveillance and lands, preferably where it cannot easily be seen, such as on the edge of a rooftop. The MAV may employ its terrestrial locomotion mode of mobility to explore the environment and collect further information, take cover in a less conspicuous position and/or to better position itself for data gathering, e.g., to orient its camera toward a location of interest, or point a directional microphone at a subject of interest, etc. The MAV might then fly to repeat the mission at another location, to return home, or, if armed with a weapon, to attack a target after lying in wait and/or assisting in the positive identification of the target. Another typical mission for the MAV of the present invention might be as a node in a self-healing wireless communications network, or as a communications disruptor. The MAV could also be used in cooperatively coordinated swarms or flocks of similar MAVs or other autonomous vehicles.

Thus one embodiment of the present invention is a multi-mode mobility micro air vehicle (MAV) self-containedly comprising an aerodynamic body capable of flight, the surface of the aerodynamic body having aerodynamic controls; an air propulsion system; and at least one retractable leg adapted to deploy, and thereafter cyclically extend and contract under power to effect a directed hopping motion in conjunction with the air propulsion system and the aerodynamic controls wherein the multi-mode mobility MAV is capable of flying, safely landing, and hopping to a new orientation or position on the retractable leg. The MAV is also preferably capable of pivoting to a new orientation about its retractable leg without hopping. In certain embodiments, preferably, the MAV is under 600 grams in mass and fits into a cubic volume no more than 16 inches in any dimension without disassembly. In other embodiments, preferably, the MAV is under 500 grams in mass and fits into a cubic volume no more than 12 inches in any dimension without disassembly. In other embodiments, preferably, the MAV is under 400 grams in mass and fits into a cubic volume no more than 10 inches in any dimension without disassembly. Preferably, the MAV is capable of flying for at least 15 minutes. More preferably, the MAV is capable of flying for at least 30 minutes. More preferably, the MAV is capable of flying for at least 45 minutes. More preferably, the MAV is capable of flying for at least 90 minutes. Further preferably, the MAV is capable of unaided vertical takeoff and resumption of flight after safely landing, in some instances utilizing one or more rigid appendages actuated to stay up against or within the aerodynamic body during locomotion, and while the MAV is stationary with respect to a ground surface, actuated to extend outwardly from the aerodynamic body to press against the ground surface, inclining the aerodynamic body upward during preparation for vertical takeoff. Also preferably, the MAV's air propulsion system comprises coaxial contra-rotating propellers. Also preferably, the MAV's aerodynamic controls comprise plasma actuators. Also preferably, the MAV's navigation is at least in part controlled by an adaptive predictive feedback controller, preferably implemented within the MAV. Also preferably, the air propulsion system comprises contra-rotating propellers, which have been selected from a set of available contra-rotating propellers so as to be optimized for one or more of reduced noise operation and increased low-speed thrust.

Another embodiment of the present invention is a method of terrestrially locomoting a flying sensor platform (FSP) or a flying communications platform (FCP) comprising landing the FSP/FCP on a ground surface; hopping the FSP/FCP on at least one retractable leg; while hopping, simultaneously moving the FSP/FCP forward via an air propulsion system; and while hopping, simultaneously orienting the FSP/FCP via aerodynamic controls. This embodiment may further comprise the step of taking off vertically and resuming flight after the steps of landing, hopping, moving forward and orienting the FSP/FCP. Preferably, this embodiment further comprises the step of idling and generating electrical power via photovoltaic cells structurally integrated into the FSP/FCP after the steps of landing, hopping, moving forward and orienting. The method preferably further comprises the step of idling and generating electrical power via photovoltaic cells structurally integrated into the FSP/FCP after the steps of landing, hopping, moving forward and orienting. This method preferably further comprises the steps of the FSP/FCP approaching and circling a target of interest and wirelessly transmitting pictures or video while in close proximity to the target. Preferably, in this method, the air propulsion system comprises coaxial contra-rotating propellers, and/or the aerodynamic controls comprise plasma actuators.

Yet another embodiment of the present invention is a statically and passively dynamically stable hopping leg for terrestrial locomotion of a micro air vehicle (MAV), flying sensor platform (FSP) or flying communication platform (FCP), the hopping leg comprising a foot having an underside, the underside having a convex curvature such that, when fully deployed from a micro air vehicle or flying sensor or communications platform, the center of curvature of the foot is higher than the center of mass of the MAV, FSP or FCP, and the top side being connected to a rigid output link, the output link being connected to a lower link and an upper link, each of the lower link and the upper link being attached to a rigid frame, which also holds one or more rotating cams, wherein the rotation of the one or more rotating cams is transferred into a hopping motion of the output link; and wherein the hopping leg is retractable into the body or airframe of the MAV, FSP or FCP such that the foot retracts to be flush with or adjacent to the body or airframe and completely closes off the body or airframe. Preferably, the foot has a curvature that is dynamically matched to the mass moment of inertia of the MAV. Also preferably, a rotary actuator drives one or more rotating cams that are used to excite a hopping motion and extend and retract the leg into the MAV/FSP/FCP's body or airframe. Further preferably, a series arrangement of an actuator and a spring creates a driver for a harmonic hopping motion produced by the hopping leg. Also preferably, the links and rigid frame of the hopping leg constitute a four-bar mechanism, and one or more links of the four-bar mechanism act as both a kinematic link and a spring element of the hopping mechanism.

Generally, rolling is a much more energy efficient means of ground locomotion than walking, hopping, or flying; it also tends to be smoother, quieter, and visually less attractive, lending rolling greater stealth than walking, flying or hopping. Although, as discussed above, rolling carries other certain disadvantages inasmuch as its usefulness is limited by terrain requirements, it would be desirable to be able to roll when permitted and hop when not permitted. Thus in some embodiments of the present invention, one or more wheels are either built into the foot or located elsewhere on the underside of the MAV body. The wheel(s) may be motorized or unmotorized. If motorized, the MAV could drive the wheel or wheels to produce ground locomotion, and if unmotorized, the MAV could rely on its propeller(s) (or other similar air propulsion system) to propel itself on the unmotorized wheel(s) to produce rolling ground locomotion. If built into the foot, the wheel could then be immobilized (either by means of the motor or by means of a brake) when the MAV would enter into hopping mode. As such the MAV would have multiple means of ground locomotion, each of a different efficiency. If built into the foot, the suspension of the wheel(s) and/or the pliant tire(s) of the wheel(s) and/or springy spokes of the wheel(s) would confer the additional advantage of springiness or bounciness during hopping. The drawback of this additional mode of terrestrial locomotion is the greater weight of the wheel(s) and associated components, so it is not necessarily desirable in all embodiments.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

FIG. 1a. Ventral perspective view of one embodiment of the MAV of the present invention with hopping foot retracted.

FIG. 1b. Ventral perspective view of the FIG. 1a embodiment of the MAV of the present invention with hopping foot deployed.

FIG. 5. Mass with spring foot diagram showing relationship between center of mass and center of curvature in the hopping foot of the present invention.

FIG. 6. Cutaway side perspective view of one embodiment of the MAV of the present invention showing one embodiment of the hopping foot of the present invention.

FIG. 17a. Illustration of the MAV of the present invention in flight using active flow controls on its control surfaces.

FIG. 17b. Global navigation control loop diagram of the MAV of FIG. 17a.

FIG. 17c. Local actuator control loop diagram of the intelligent control module of FIG. 17d.

FIG. 17d. Perspective illustration of the intelligent control module (ICM) of the MAV of FIG. 17a, which may use deployable flow effectors or plasma flow effectors.

FIG. 19. Illustration of an exemplary flying communication platform mission use of the MAV of the present invention.

DETAILED DESCRIPTION OF THE INVENTION

Figure 1C:
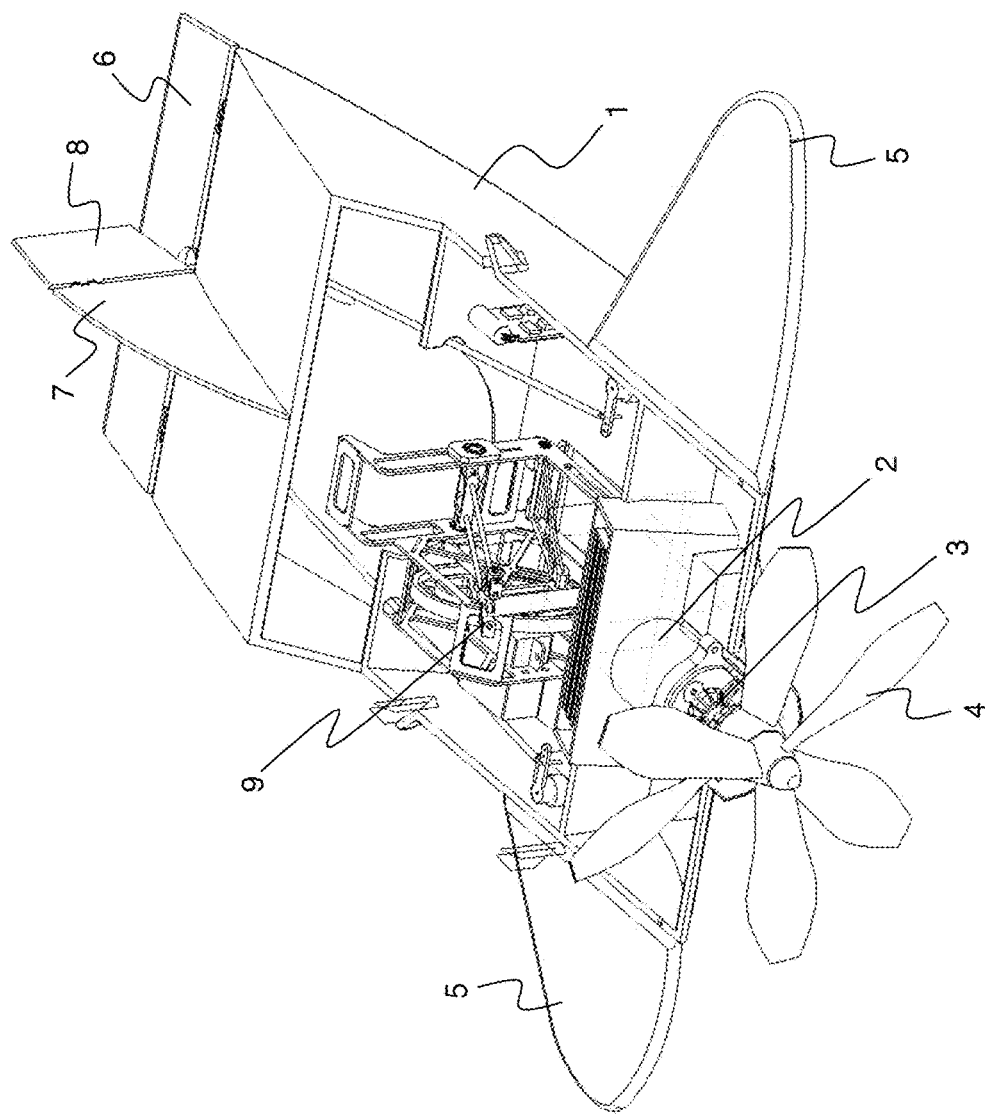
FIG. 1c. Dorsal perspective cutaway view of another embodiment of the MAV of the present invention with hopping foot retracted.

A flying sensor platform (FSP) is any unmanned flying vehicle having a payload of one or more sensors for detecting conditions or stimuli which are important not merely for the operation of the vehicle. The sensors may be, for example, video and/or audio sensors (cameras and/or microphones, or electro-optical infrared camera combinations), sensors for detecting weather conditions (temperature, barometric pressure, wind speed, darkness or cloudiness), sensors for detecting movement (gyroscopes, accelerometers, infrared sensors, laser sensors, radar sensors, sonar sensors, seismometers), sensors for detecting position or range (GPS, laser range finders), sensors for mapping (synthetic-aperture radar), sensors for detecting attitude, altitude, airspeed, or other flight parameters, or sensors for signals intelligence (SIGINT). Recordings from the sensors may be written to a memory (such as a flash memory or hard disk), or may be transmitted via wireless transmission (such as radio frequency [RP] transmission, infrared transmission, microwave transmission or laser optical transmission), or both. Note that the definition does not include merely any unmanned flying vehicle having sensors. Wherein such a vehicle only uses its sensors to perform its flight tasks, the vehicle is not a flying sensor platform. An unmanned airplane with an altimeter is not, per se, a flying sensor platform. The sensed data must be important for some other purpose beyond merely operating the vehicle, and must be reported back to some home base, either by means of wireless communication or by returning home with sensed data saved to memory storage, such as a flash memory, hard drive, etc.

A flying communications platform (FCP) is any unmanned flying vehicle having a payload of one or more systems for automated wireless communications reception and retransmission, either with ground-based communications systems, or satellite communications systems, or with other roving or flying communications platforms. The communications may be of any type known in the art, including but not limited to radio frequency (RF) transmission, infrared transmission, microwave transmission, laser optical transmission, audio signals, flags, flares, etc. The wireless communication may take place over existing wireless networks (such as cellular telephone networks, satellite systems, and WiFi internet or intranet systems), or may take place over networks created by the flying communications platform and its cohorts as the nodes of the network, whether they be other flying communications platforms or ground-based routers, hubs, bridges, repeaters, transceivers, etc. Note that the definition does not include merely any unmanned flying vehicle having wireless communications equipment. Wherein such a vehicle only uses its communications equipment to perform its flight tasks, or to transmit signals or data throughout the vehicle, or to send signals or data to a home base, the vehicle is not a flying communications platform. An unmanned airplane that is radio controlled from a home base is not, per se, a flying communications platform, nor is an unmanned airplane that radio-transmits video data back to a home base. The communications must be received and retransmitted for some other purpose beyond merely operating the vehicle or transmitting data which has been generated by the vehicle from the vehicle. In this sense, a flying communications platform may be thought of as a flying radio repeater, or a flying cellular communications substation, or a flying WiFi Internet router. These are examples of systems which are capable of automated wireless retransmission of communications signals.

Figure 2:
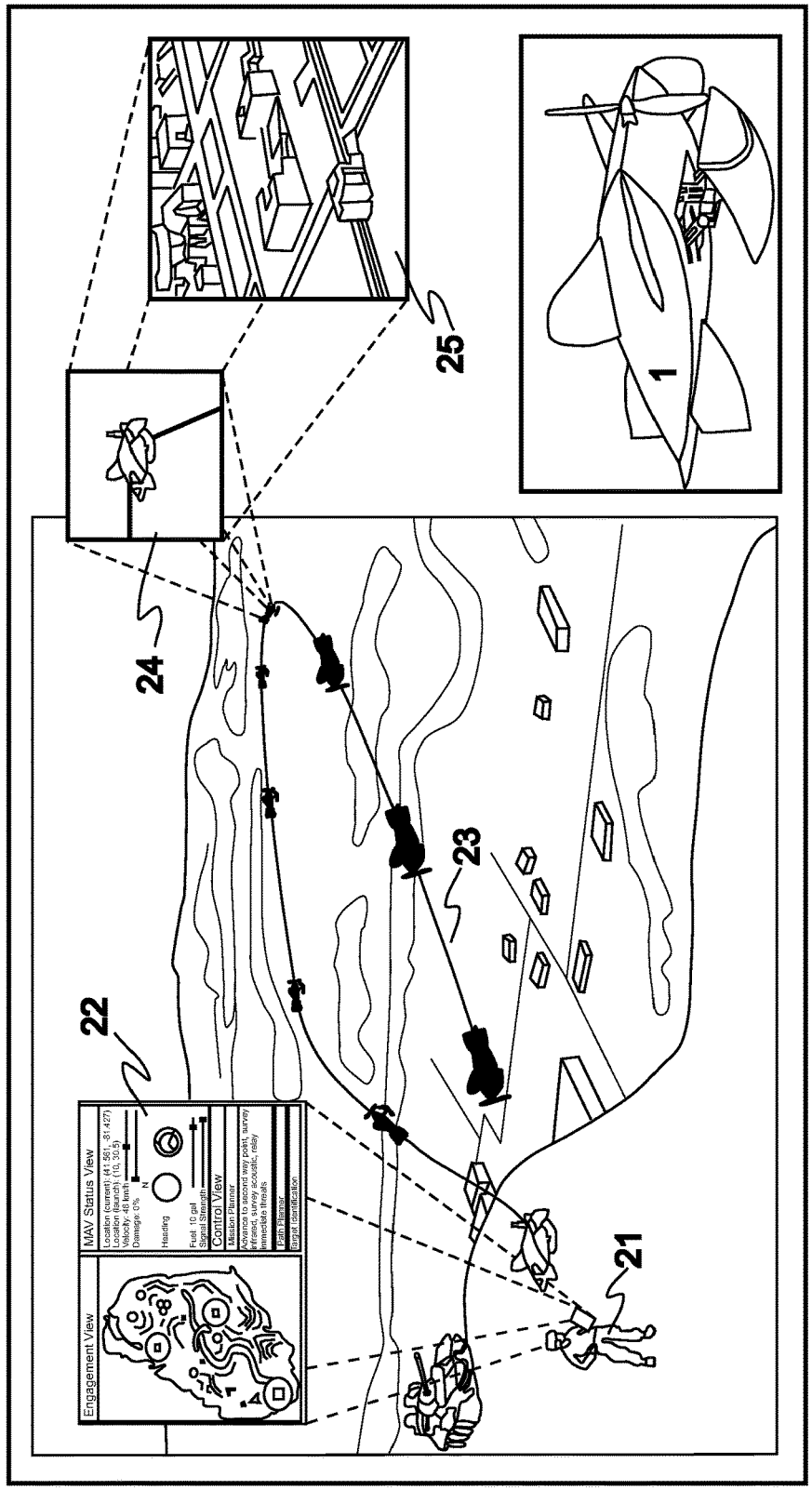
FIG. 2. Illustration of an exemplary mission use of the MAV of the present invention.

In various embodiments, the MAV of the present invention may act as a flying sensor platform or a flying communications platform or both. Various exemplary mission scenarios are illustrated in FIG. 2, FIG. 15 and FIGS. 18-21. The exemplary mission use of the MAV of the present invention shown in FIG. 2 illustrates that the MAV, which is small and light enough to be man-packable, can be hand or ground launched 21 from safe distances by a soldier or other operative preferably having a computer, which could be a laptop computer, smart phone or similar device. The MAV is then controllable using a friendly graphical user interface (GUI) 22 displayed on the computer or similar device, which displays an Engagement View showing the MAV's geographical location on a topographical map; a MAV Status View showing the MAV's current coordinates, the coordinates of its launch point or home base, its instantaneous velocity and heading, a damage assessment, fuel, and communications signal strength; and a Control View with a Mission Planner into which general mission objectives can be entered, a Path Planner into which more specific navigation commands can be entered, and Target Identification by which targets of interest may be identified. Intelligence gathered by the MAV (for example, in the form of images 25 or video) may also be displayed and assessed using the GUI. The MAV performs aerial surveillance while in flight 23, then lands and transforms to ground locomotion mode 24 to survey and explore. In a typical scenario the MAV will land on a rooftop and terrestrially locomote itself to a roof ledge for a perch-and-stare surveillance operation. Upon completion of its mission or at the direction of its remote control, the MAV may then take off and return by aerial locomotion to home base or to another mission location.

In the following disclosure "loitering" will refer to a MAV's holding more or less constant relative position under power while "idling" will refer to the MAV's period of operation without the use of powered locomotion. In either instance the MAV may still be using or consuming power to provide for sensor and communications operations. "Loitering" may be aerial (e.g., circling an observation target) or ground-based (hopping around a target). "Idling" may involve movement if it is unpowered (e.g., riding piggyback on some other vehicle, like the back of a truck or the top of a train).

Various different configurations of the MAV body of the present invention have been constructed and tested for thrust capability. One early iteration carried a single 799c Firefly motor and an 8.4 V battery, and generated 70 grams of thrust. The same model with a 12.6 V battery generated 95 grams of thrust. A revised model having a single 796 GWS Firefly motor and a 12.6 V battery generated 100 grams of thrust but the single propeller generated noticeable propeller torque. A third design having two side-by-side counter-rotating propellers powered by twin 799c Firefly motors and a 12.6 V battery generated 130 grams of thrust, and the counter-rotating propellers made it very stable in flight. A fourth body iteration used a single larger propeller powered by a single Mighty Micro 10 motor and a 12.6 V battery, this time generating 325 grams of thrust; however, the propeller torque was uncontrollable at full throttle, and the larger prop diameter would interfere with ground locomotion. Fifth and sixth iterations used coaxial contra-rotating propellers and a transmission to deliver power to the propellers. Different propeller shapes were tested and a Kestrel autopilot was integrated into the sixth iteration.

Figure 1D:
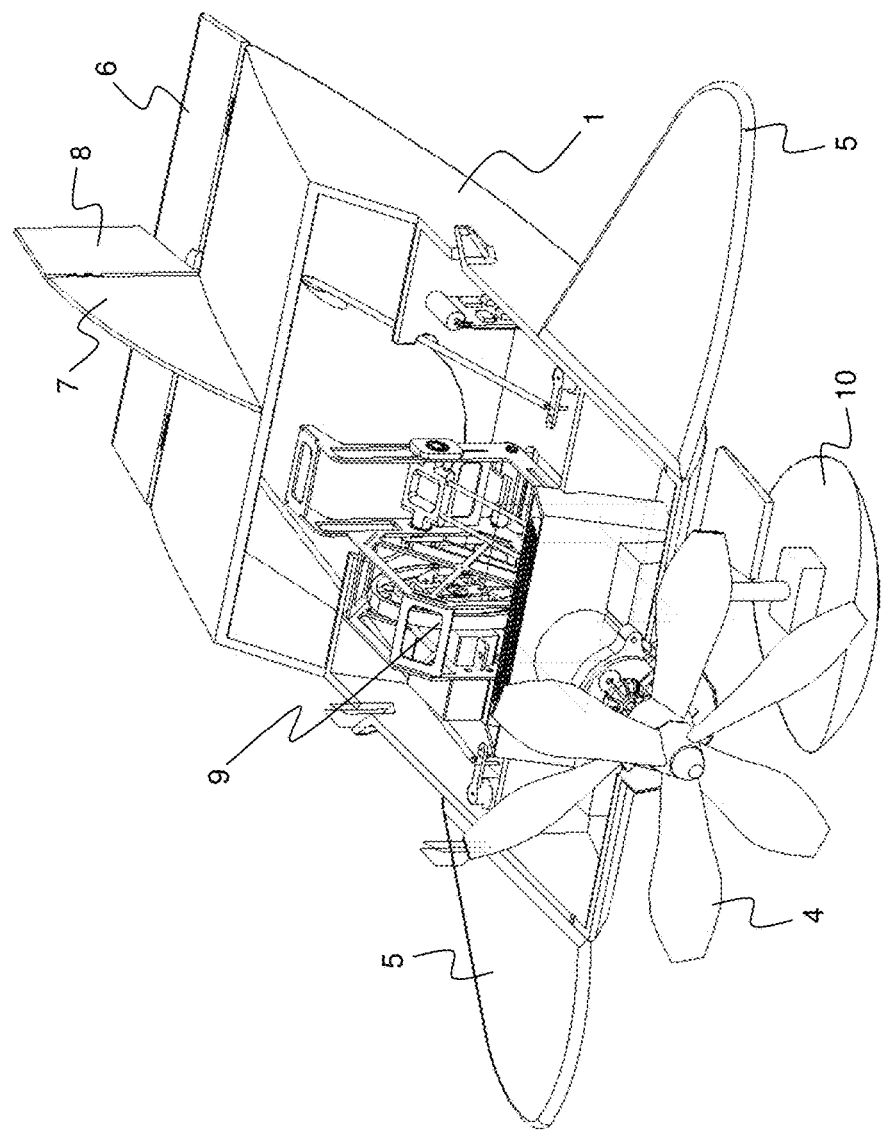
FIG. 1d. Dorsal perspective cutaway view of the FIG. 1c embodiment of the MAV of the present invention with hopping foot deployed.

The following general description of the preferred airframe of the MAV of the present invention makes reference to FIGS. 1a-1d. FIGS. 1a-1b show a single-propeller embodiment while FIGS. 1c-1d show a contra-rotating propeller embodiment. Generally, the preferred airframe of the MAV of the present invention comprises an airfoil 1 of equal or greater length (as measured from front to back) than width (as measured from the left to right side) as a fuselage, preferably neither dimension exceeding about 16 inches, with the motor(s) 2, transmission(s) 3 and propeller(s) 4 mounted at the front of the fuselage. Preferably, four winglets 5 attach to the forebody of the fuselage for added lift and for high angle of attack stability. Preferably, two of these winglets are positioned nearer the forebody, have a backward sweep and are roll-angled straight out or slightly downward, whereas the other two winglets are positions slightly aft of the first two winglets, have a forward sweep and are roll-angled straight out or slightly upward. The aft of the airfoil of the body terminates in a single elevator 6, or, alternatively, in multiple elevons. Attached on the top (or bottom, or both) of the airfoil body near the aft is a vertical fin 7 having a rudder 8. In certain embodiments, preferably, a door or hatch is provided in the fuselage for easy access to the motor, transmission, hopper subsystem 9, autopilot, communications system (including modem), payload(s), and other internal systems. Also in some embodiments a thin pliant antenna (not shown in FIGS. 1a-1d) hangs or trails, stringlike, off of the back of the vehicle in flight to facilitate wireless communication between the MAV and the base station. It is contemplated that variations on the body of the MAV of this embodiment of the present invention could be conceived by a person skilled in the art by varying the numbers and positions of the control surfaces on the airfoil body, or by making modifications to the airfoil body, and that the embodiment(s) described and illustrated merely represent an exemplary or preferred body form rather than representing the only body form with which the present invention may be embodied.

Additionally, the traditional control surfaces, and particularly the elevator, may be supplemented or replaced with advanced control surfaces for actively controlling flow. In various embodiments, such as the one illustrated in FIG. 17d, the trailing edge (or leading edge or both) of the MAV 1 airframe's airfoil-shaped fuselage is embedded with sensors and flow control actuators. The flow control actuators can be deployable flow effectors of the type(s) described in any of U.S. Pat. Nos. 5,755,408, 6,165,904, 6,685,143 B1, 6,837,465 B2, 7,070,144 B1, 7,226,015 B1, and 7,334,760 B1 (which are herein incorporated by reference) or any other deployable flow effectors known in the art capable of being mounted to MAV within the vehicle space and weight restrictions described in this disclosure, or can be weakly-ionized plasma actuators of the types disclosed in U.S. Pat. No. 7,624,941 or U.S. patent application Ser. No. 11/710,750 (also herein incorporated by reference). Actuation in this manner achieves a constant shift in the lift coefficient throughout a range of aerodynamic conditions, creating an effect like wing warping without physically bending the wing. Using such an active flow control can produce a hingeless flight control, improve air vehicle performance by directly altering the vehicle's effective aerodynamic shape, and eliminate moving-part control systems that can be more prone to failures and especially the types of control failures that result in the loss of the MAV, resulting in a less fragile, more durable MAV capable of surviving a greater number of missions in a wider variety of mission scenarios. Solid-state flight actuation systems advantageously enable increased aerodynamic performance and reduced system complexity. In FIG. 17a, one embodiment of the MAV 1 of the present invention is equipped with four intelligent control modules (ICMs) 171 in the aft of its airfoil-shaped fuselage in lieu of any elevator or elevon. As shown in FIG. 17d, each ICM 171 is equipped with at least one flow control actuator 172 and one or more sensors 173. The sensors 173 as illustrated are two pressure taps per ICM, but conceivably these sensors could be of a number of different types and take a number of different forms, as described elsewhere in this specification and the disclosures incorporated into it by reference. FIG. 17b shows the global navigation control loop responsible for guiding the MAV 1 along its desired flight path 174. FIG. 17c shows the local actuator control loop used to produce the boundary layer separation used for vehicle control by means of the flow effectors 172. The local actuator control loop is preferably implemented inside each individual ICM using control circuitry and/or processors as described in the previously-mentioned disclosures. However, for reasons of gross weight or weight distribution within the MAV, or other considerations, it may be necessary that the processing or computation for the local actuator control loop take place outside of the ICM 171. Likewise, in certain embodiments the global navigation control loop takes place within the MAV, but in other embodiments certain portions of the control loop may be removed to take place outside of the MAV, for example, at a remote base station, which may be computationally or observationally better-equipped to handle certain issues of automated control.

The construction of the airframe of the MAV of the present invention may be of any materials and process known in the art, but is preferably made to be as lightweight as possible. In some embodiments, the airframe may be made of polystyrene foam with a single layer of very thin fiberglass and epoxies to increase airframe durability at low weight cost (e.g., 3.5 grams per MAV). In other embodiments the airframe may be made of carbon fiber-reinforced polymer or other lightweight materials. As described later, the airframe may also be made of thin, sturdy composite materials which provide for energy storage or energy harvesting or both.

Figure 3:
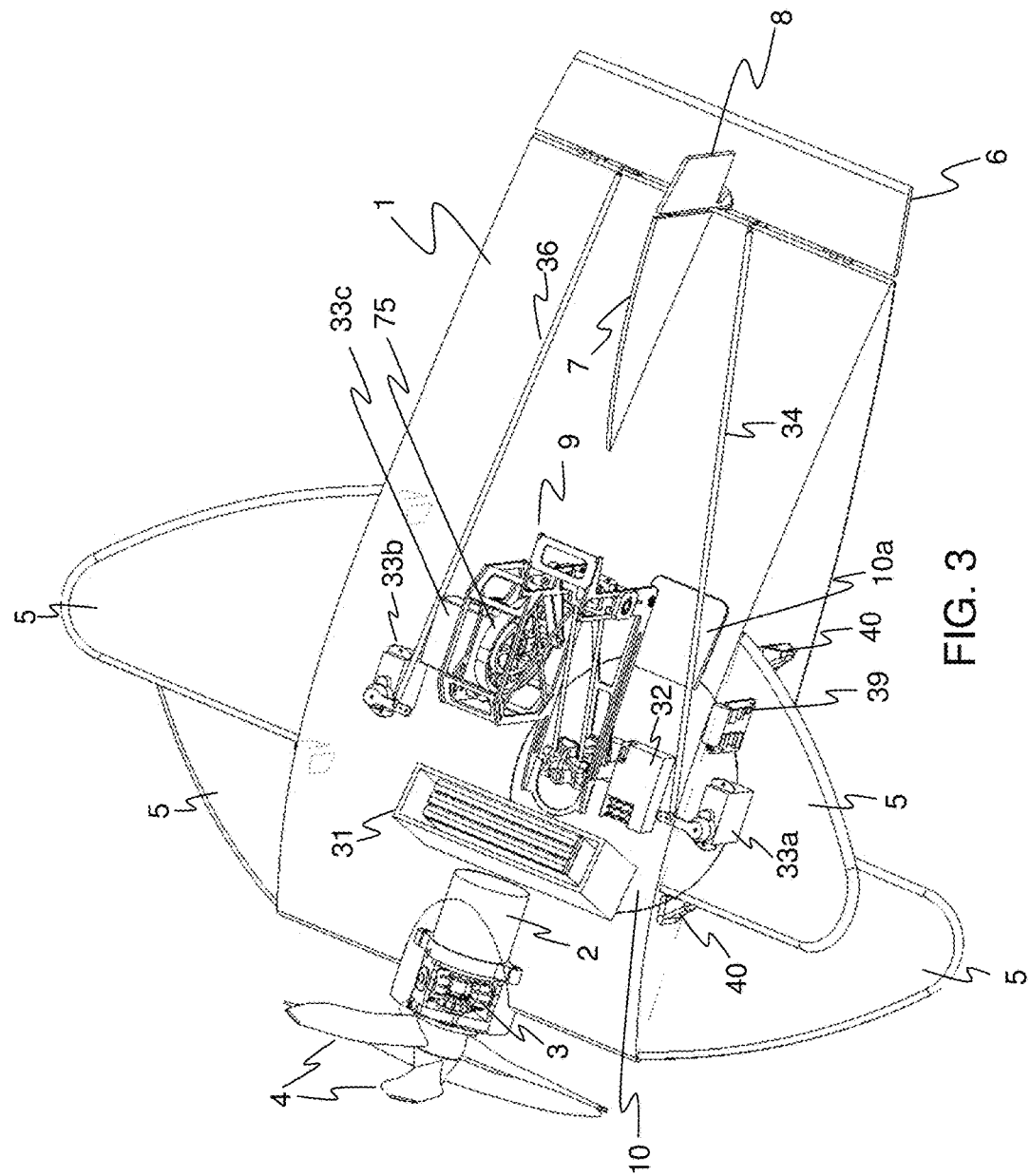
FIG. 3. See-through dorsal perspective view of one embodiment of the MAV of the present invention showing distribution of components in MAV interior.
Figure 4:
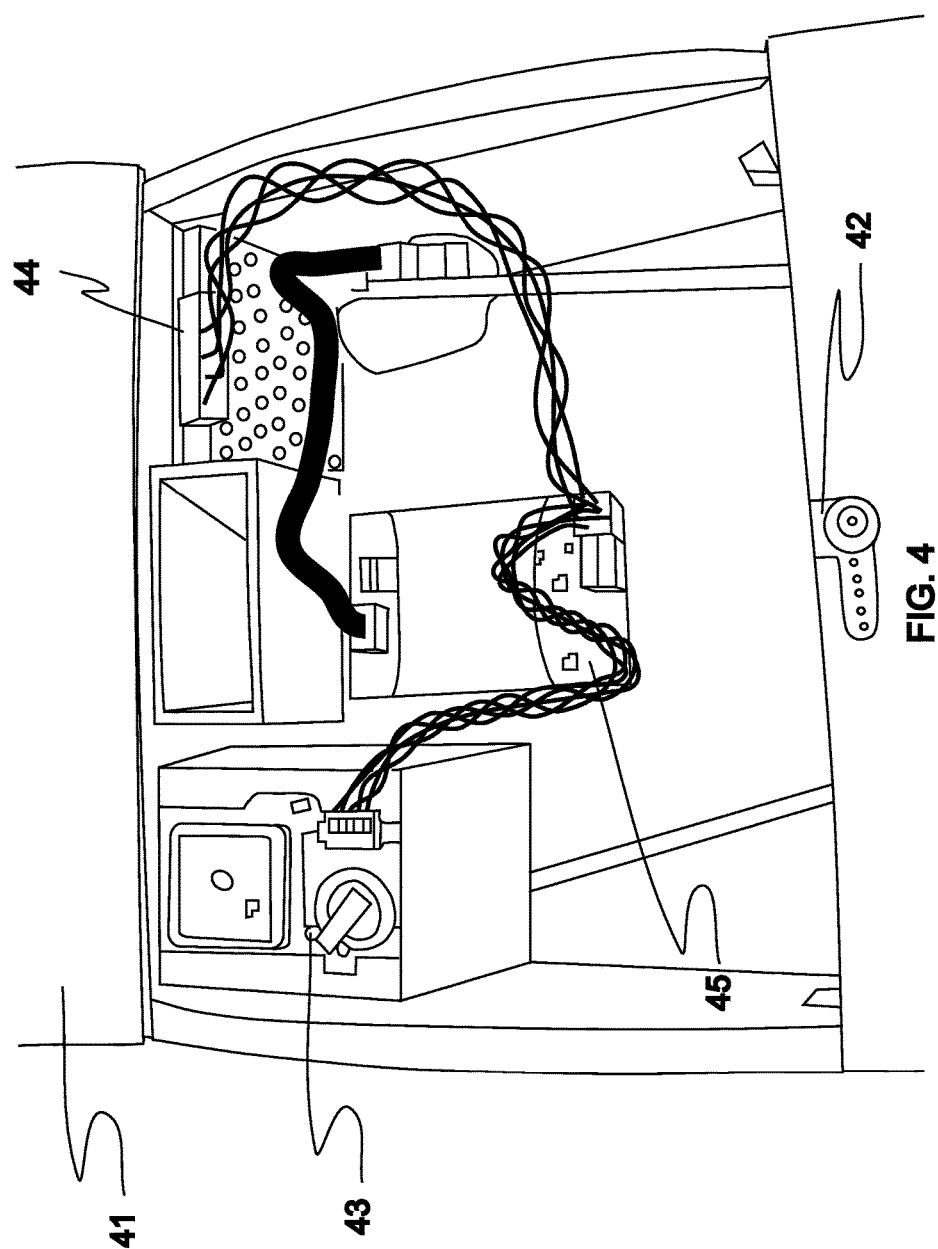
FIG. 4. Interior view of one embodiment of the MAV of the present invention showing distribution of components in MAV interior.

As illustrated in FIG. 3, internal to this airframe are a motor 2, for example, the Astro Flight Mighty Micro 100 W brushless motor; a 3-cell polymer lithium battery 31; a radio receiver 32; a propulsion motor controller and power regulator 39; a rudder flight servo 33a which connects to the rudder 8 by a thin lightweight rudder control rod 34; an elevator flight servo 33b which connects to the elevator 6 by a thin lightweight elevator control rod and lever 36; a hopping mechanism servo 33c; a hopping mechanism cam 75; and a hopping four-bar mechanism 9 connecting to a hopping foot 10. The body also has four exhaust ports 40 for heat management. As shown in FIG. 4, a hinged access panel door 41, possibly having latch 42, may permit access to the payload or internal components of the MAV for replacement or repair.

With reference to FIG. 4, in various embodiments, autopilot functionality may be integrated into the airframe or the MAV with a GPS receiver and antenna 43, a modem 44, and an autopilot 45. UAV autopilots each year become lighter and more fully-featured; an exemplary such system is the commercially-available Kestrel autopilot from Procerus Technologies. The Kestrel 2.4 comes in small integrated circuit/printed circuit board package weighing 16.7 grams and measuring 2 inches by 1.37 inches by 0.47 inches, allowing it to fit into a 2.73-square inch area and a 1.29-cubic inch volume. Such an autopilot estimates attitude using a 3-axis angular rate measurement, a 3-axis acceleration measurement, and a 2-axis magnetometer and estimates airspeed and altitude using absolute and differential pressure sensors. It features a 29 MHz processor with 512 KB RAM and FLASH, 4 serial ports, 4 onboard servo ports, 8 external servo ports, 12 digital I/O channels (6 bi-directional, 3 input, 3 output), 3 analog inputs at 12 bit resolution, and an optional piggy-back modem header. The autopilot is capable of smart camera-based aerial loitering, choosing an optimal loitering radius to maintain a desired side look field of view and can compute loiter offset for wind. The Kestrel also advantageously has a software-based pilot interface that can show data in real time and can display the UAV's camera view.

The MAV may employ various camera systems to deliver or record visual information. Such systems are improving continuously, but as of the time of this disclosure wireless CMOS camera systems having 510×492 pixel resolution with a line of sight range of approximately 50 meters were commercially available at very low cost (less than $55). Such cameras transmitted on an unlicensed frequency (1.2 GHZ), used a 62° viewing angle pin-hole lens and provided a single channel of audio while drawing approximately 235 mA of current and adding 20.6 grams of mass to the MAV.

Landing is aided by the low stall speed of the MAV and its low mass. The low speed and mass effectively reduce the impulse that can be imparted to the vehicle during landing. In addition, the ground locomotion system can also be used to ameliorate the effects of short, abrupt landings. In a typical landing phase, the vehicle enters a high angle of attack to reduce the vehicle's velocity and slow its descent by directing the propulsion system upwards; the hopper leg is then deployed as a shock-absorbing skid for landing.

Takeoff is similarly helped by the low mass and flight velocity of the vehicle, permitting the vehicle to transition to flight more quickly and at a lower speed. The hopping locomotion can give the MAV a "running start" in takeoff or the vehicle can orient itself upwards for vertical takeoff using an appendage system described below.

As shown in FIG. 5, the hopping mechanism (or "hopper") of the present invention generally comprises a hopping leg 9 comprising a foot 10, the foot having an underside that is convexly curved such that the center of curvature (CC) of the system is never lower than the center of mass (CM) of the system 50, where "system" refers to the hopping mechanism, the MAV that it is attached to, its payloads, etc. As long as the center of mass is lower than the center of curvature of the foot, the vehicle is statically stable. If the foot's radius of curvature is properly selected, the system will not only be statically stable but will also be dynamically stable during hopping as disturbances to the hopping motion will be passively corrected for. If the radius of curvature is too large, the restoring forces will be too large, causing instability due to overcorrection. If the radius of curvature is too small, then the restoring force will be too small, causing instability due to undercorrection. Preferably, the foot has a curvature that is dynamically matched to the mass moment of inertia of the MAV. By "matched" it is meant that the restoring movement generated during the hopping motion when the foot and leg is perturbed from vertical is sufficient to right the vehicle without causing instability in the system. A foot that is too flat will cause too great a restoring force that will cause the vehicle to start into an oscillation in the plane of the disturbance that will grow in amplitude until the vehicle is upset. If the foot is too curved, then the restoring moment will be too small and a perturbation of the hopping motion from vertical will cause the vehicle to tip over. Moreover, rudimentary forward locomotion is achieved through placement of the center of mass of the system ahead of the center of curvature of the foot. Improved forward locomotion is attained with the aid of the MAV's propulsion system, e.g., one or more propellers. Directional control is achieved through use of the propulsion system in combination with the aerodynamic controls, e.g., the tail rudder. Directional control is possible both when the MAV is stationary as well as when it is moving: by running the propeller at subflight speeds in combination with actuation of the rudder when the hopper is not hopping, the MAV can yaw-pivot on its monopodal leg, while adding the hopping motion of the hopper allows the MAV to move forward and turn at the same time. The addition of the elevator control allows increased forward speed and aids in stationary turning. Increased forward speed is achieved by using the elevator to counter the forward pitching moment that is a result of increased forward thrust. This counter moment is created by air flow over the elevator from the propulsion system. This allows for increased thrust and thus forward speed without the nose of the MAV pitching down and allowing the propeller to strike the ground surface. Likewise this same mechanism allows for increased yaw rates while stationary by allowing greater airflow over the rudder without letting the MAV pitch forward, which would, again, impermissibly allow the propeller to strike the ground surface. It will be appreciated by (and readily apparent to) someone skilled in the art that, critically, the configuration of the MAV must not permit the propeller to be obstructed or interfered with during hopping locomotion either by coming into contact with the hopper or with the ground surface.

Two different hopper actuator systems are disclosed, as shown in FIG. 6, FIGS. 7a-7d, and FIG. 8. The first disclosed hopping mechanism (FIG. 6 and FIGS. 7a-7b) utilizes a parallel actuator and spring, with bushings at the joins and a dual cam ratchet design. A preferred mechanism (FIGS. 7c-7d and FIG. 8) utilizes a series actuator and spring with ball bearings at the joints and a single cam design. The basic configuration of the hopping mechanism is a four-bar mechanism. This particular four-bar mechanism is a parallelogram four-bar. This allows the output link (i.e., the leg) to move up and down in a vertical orientation with no rotation and with minimal lateral motion.

The frame 71a/71b of the hopping mechanism provides rigidly supports the hopping actuator (not shown in the referred-to drawings) and attaches the hopping mechanism to the rest of the MAV airframe. It also houses the bearing for the proximal ends of the connecting links of the mechanism.

The upper link 72a/72b transmits the actuator's output via the cam 75a/75b, which is attached to the output of the actuator (not shown here), to the rest of the mechanism. In the first disclosed hopper mechanism (FIG. 6 and FIGS.

Figure 7B:
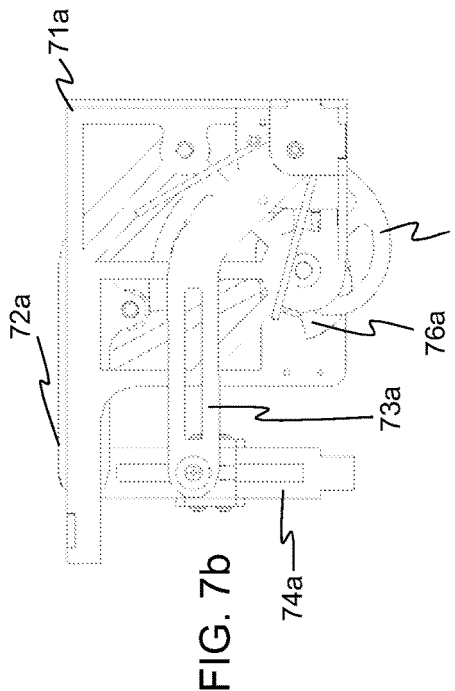
FIG. 7b. Schematic diagram of a first disclosed embodiment of the driving mechanism of the hopping foot of the present invention.
Figure 7D:
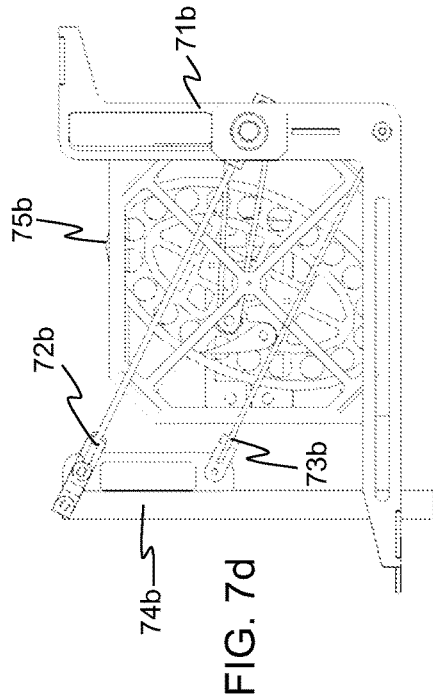
FIG. 7d. Schematic diagram of a second disclosed embodiment of the driving mechanism of the hopping foot of the present invention.
Figure 7A:
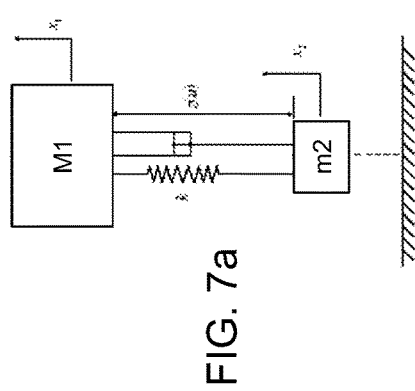
FIG. 7a. Simplified system diagram of a first disclosed embodiment of the driving mechanism of the hopping foot of the present invention.
Figure 7C:
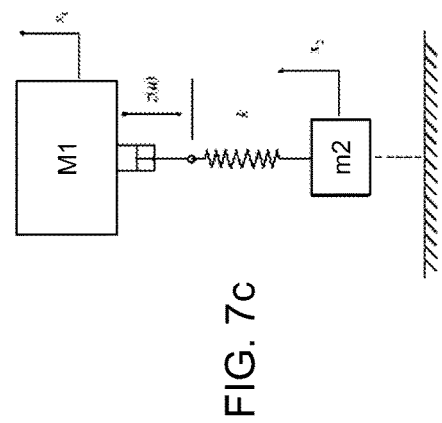
FIG. 7c. Simplified system diagram of a second disclosed embodiment of the driving mechanism of the hopping foot of the present invention.
Figure 8:
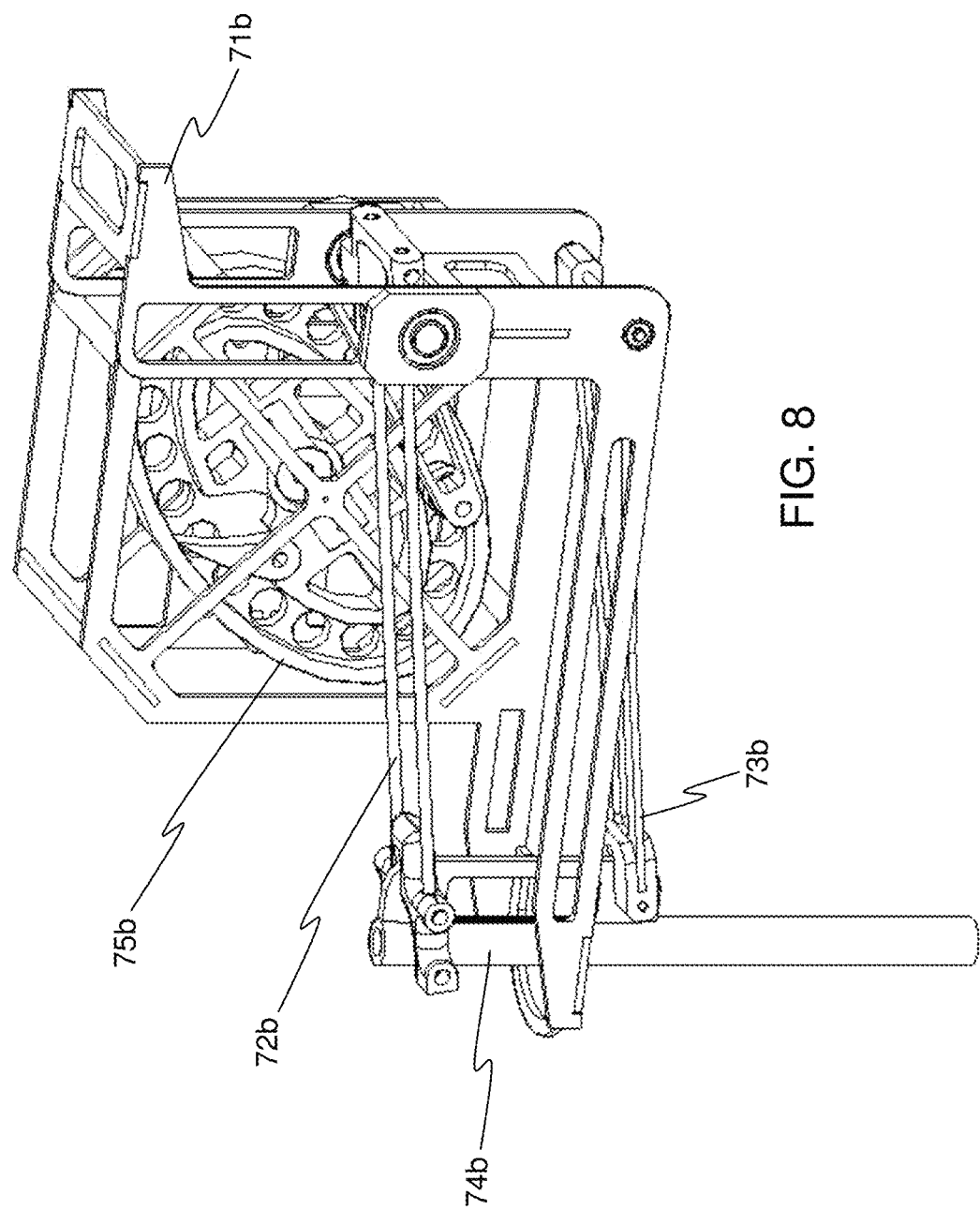
FIG. 8. Perspective view of a second disclosed embodiment of the driving mechanism of the hopping foot of the present invention.
Figure 9:
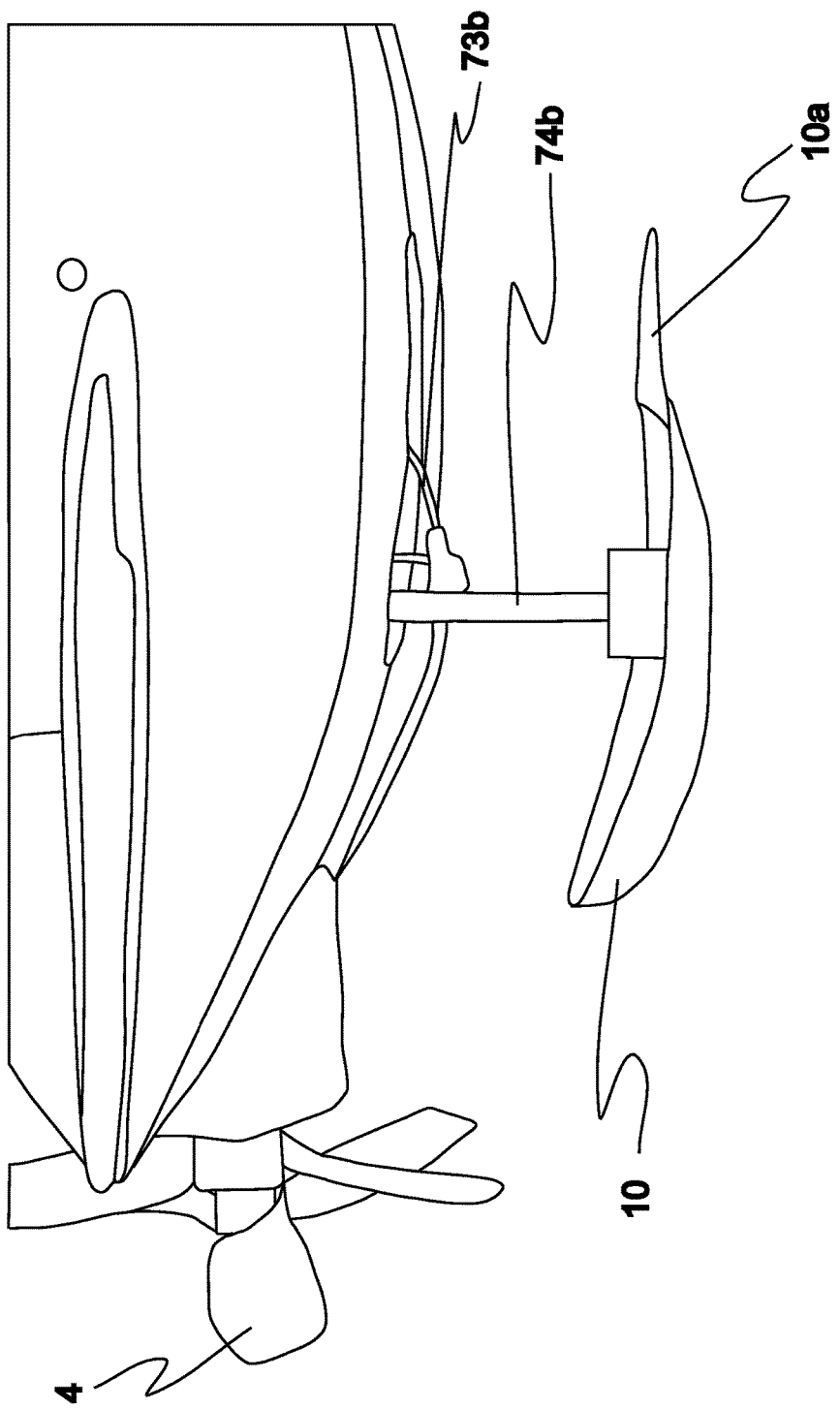
FIG. 9. Perspective view of the MAV of the present invention showing its retractable hopping foot deployed.

7a-7b), which utilizes a parallel actuator-spring arrangement (as shown in FIG. 7a), this link's only other function is as the upper structural link 72a of the four-bar mechanism. In the second and preferred version of the mechanism (FIG. 7c-7d and FIG. 8), which utilizes a series arrangement of actuator and spring (as shown in FIG. 7c), in addition to transmitting the actuation force and being the upper structural link of the four-bar mechanism, the link 72b is also the spring of the mechanism.

The lower link 73a/73b is primarily the lower structural link of the four-bar mechanism. In the first version (FIG. 6 and FIGS. 7a-7b) of the mechanism it also transmits the force from the springs into the four-bar mechanism.

The output link (i.e., the leg) 74a/74b of the four-bar mechanism takes the rotary motion of the actuator and through the use of the cam 75a/75b and the rest of the linkage transmits vertical force to the foot, exciting the hopping motion of the system.

The cam(s) 75a/75b is/are responsible for taking the rotary output of the hopping actuator and converting it to the excitation force for the hopping mechanism. The first disclosed version (FIG. 6 and FIGS. 7a-7b) uses two cams. The smaller cam 76a excites the hopping motion of the mechanism when the actuator and hopping cam are turned counter-clockwise. The larger cam 75a is the retraction cam. The retraction cam does not rotate during hopping by using a ratchet mechanism that allows the output shaft to spin counter-clockwise without transmitting torque to the retraction cam 75a. When the output from the actuator is reversed, the ratchet mechanism applies torque to the retraction cam 75a that then causes the mechanism to retract the foot against the dorsal surface of the MAV. The second and preferred disclosed version of the mechanism (FIGS. 7c-7d and FIG. 8) uses a single elliptical cam 75b with a pawl-protected follower pocket. When the cam is rotated counter-clockwise, the elliptical cam 75b excites the hopping motion through the elastic upper link 72b. The pawl keeps the cam follower from falling into the cam pocket. When the cam is reversed (clockwise motion), then the cam follower is directed into the cam pocket by the pawl, and this allows the cam to retract the mechanism pulling the foot against the dorsal surface of the MAV.

In the embodiments illustrated in FIGS. 6-9, the hopping mechanism's carbon fiber frame 71a/71b is attached to the inside surface of the air frame and stabilized by struts on the forward bulk head. In the second disclosed version of the hopper, the carbon fiber tube 74b making up the leg extends through the ventral surface of the air frame and has the foot 10 attached. Tab 10a extending off the back edge of the foot (also seen in FIG. 3) does not affect ground locomotion but is there to cover the slot required for the hopping mechanism's lower link 73a, seen just below the ventral surface in FIG. 9. The tab closes that slot when the foot is fully retracted, keeping the airframe clean for flight.

The hopping leg design has a total of two degrees of freedom. The first degree of freedom (DOF) is the single degree of freedom embedded within the hopping mechanism and uses actuators in series with an elastic element to effect a telescoping of the leg. This DOF is excited at the natural frequency of the mass-spring system formed by the leg and vehicle body and produces an efficient hopping motion for the vehicle. The second DOF permits fore and aft angular displacement of the leg and combines with the hopping motion to provide a forward impetus to the vehicle in a manner analogous to human gait. The second DOF controls the angular orientation of the legs relative to the vehicle body and is used to move the vehicle's center of mass forward or aft relative to the center of contact between the foot and the ground. To move forward, the vehicle's center of mass is moved forward relative to the contact center and the gravity-induced moment produces a pitching motion of the vehicle body which, in turn, induces a forward component in the reaction force vector between the ground and the feet and hence imparts a forward motion to the vehicle.

Figures 10A, 10B:
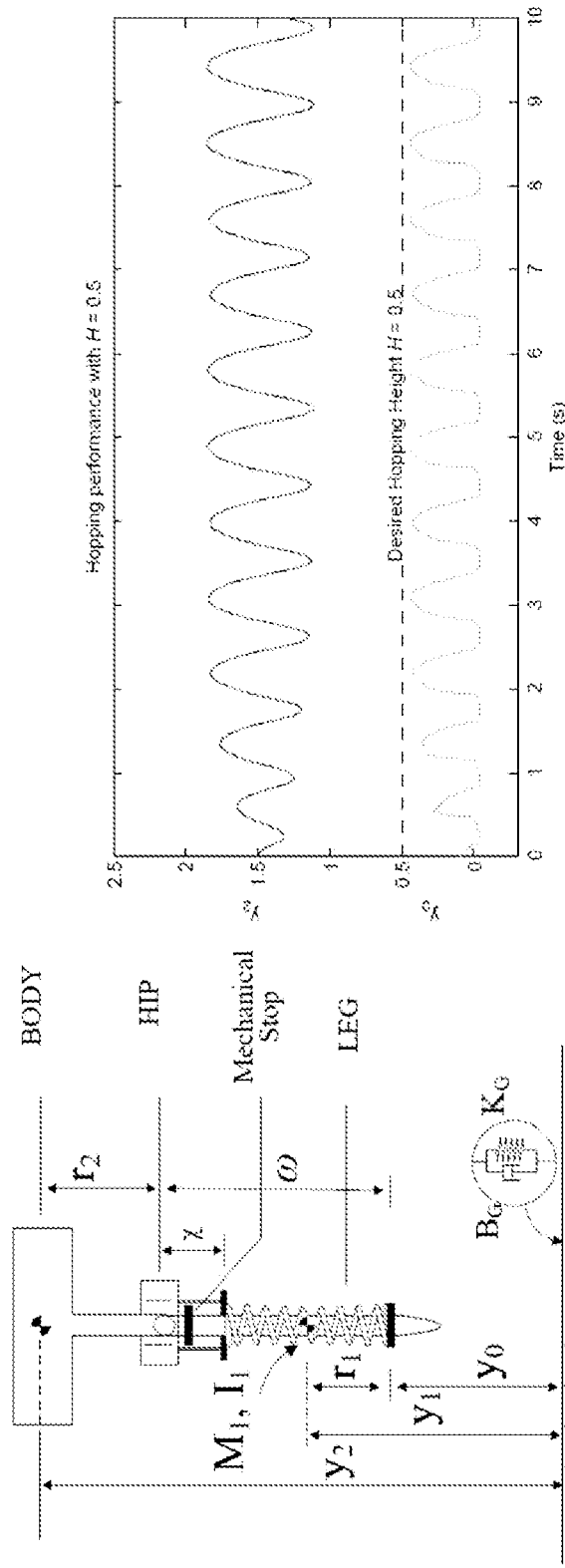
FIG. 10a. Simplified system diagram of the hopping leg of the present invention.
FIG. 10b. Graph showing hopping performance of the hopping leg of the present invention.

The hopping motion of the hopper as illustrated in the simplified system diagram of FIG. 10a is governed by the equations below:

$$M_1\ddot{y}_1 = F_y - F_T - M_{1g}g$$

$$M_2\ddot{y}_2 = F_T - M_{2g}g$$

$$y_0 = y_1 - r_1$$

$$w = y_2 - y_1 + r_1 - r_2$$

FIG. 10b is a graph showing hopping performance of the hopping leg of the present invention over a period of 10 seconds, where $y_0$ represents the clearance height of the bottom of the hopping foot, and $y_2$ represents the height of the MAV's center of mass. As shown, within very few hopping cycles the hopping height $y_0$ approaches the desired hopping height. An embodiment of the MAV of the present invention has been constructed and its hopping performance was successfully tested. The MAV was satisfactorily navigated, slalom-style, around a set of polystyrene-cup pylons using its propeller-aided hopping motion. The MAV was also shown to be able to yaw-pivot in place around its deployed hopping foot, the full 360 degrees or more in either direction.

Figure 11:
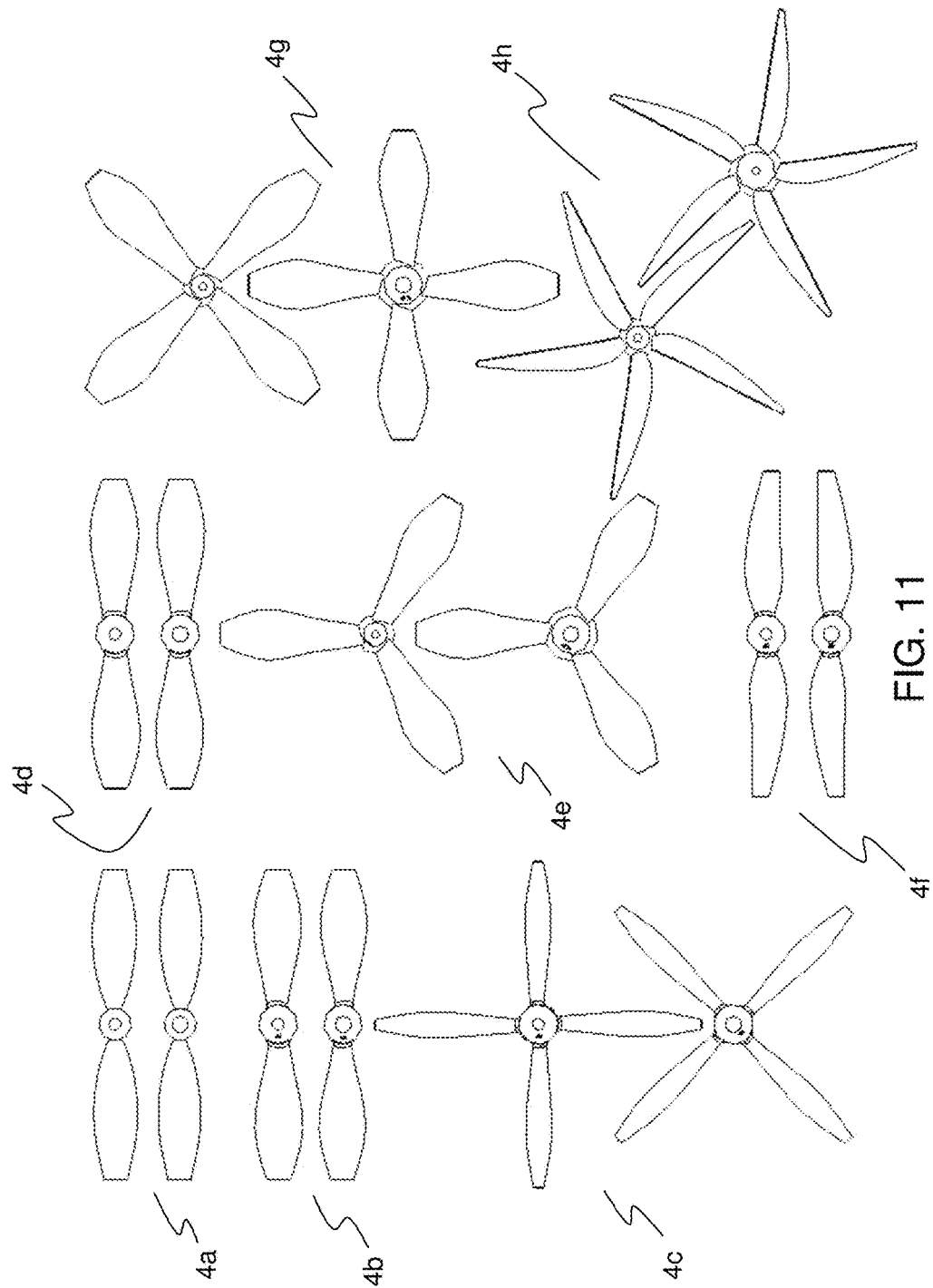
FIG. 11. Illustration of various pairs of contra-rotating propellers suitable for use for the propulsion system of the MAV of the present invention.

Some embodiments of the MAV of the present invention utilize coaxial contra-rotating propellers as a means of propulsion, conferring the advantages of canceling propeller torque and producing more thrust without increasing prop diameter. A transmission reverses the rotation direction of the drive of a single motor for one of the propellers. Use of a single motor reduces the overall weight of the craft, however, the transmission results in some power loss to the system than are present with direct drive, and the use of a single motor lends the system overall less power than the use of separate motors for counter-rotating propellers. Various propeller sets having differing geometries are envisioned and illustrated in FIG. 11. The illustrated propeller sets include two-bladed sets 4a, 4b, 4d, 4f, three-bladed set 4e, four-bladed sets 4c, 4g, and five-bladed set 4h. Propeller sets 4a, 4b, and 4d as illustrated were initial propeller pairs used to investigate pitch and test torque nullification. Propeller sets 4f and 4h were the sets used in experiments to reduce noise. Propeller sets 4c and 4g were investigated as capable of increasing low speed thrust. Propeller set 4e was eventually decided upon as the set which was optimal for the system that was built.

Figure 12:
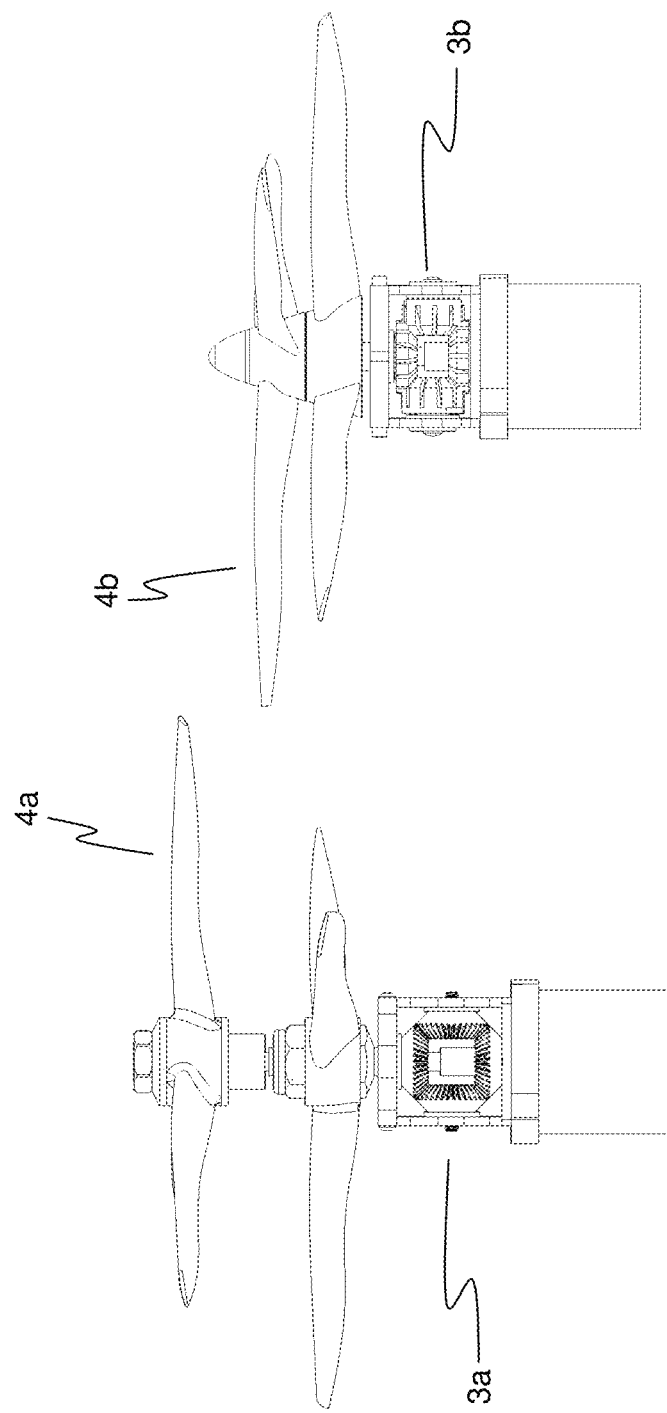
FIG. 12a. Isometric view of a first disclosed version of a contra-rotation transmission for use with some embodiments of the MAV of the present invention.
FIG. 12b. Isometric view of a second disclosed version of a contra-rotation transmission for use with some embodiments of the MAV of the present invention.

Two different contra-rotation transmissions are also disclosed, as illustrated in FIGS. 12a-12b. Both transmissions can use, for example, the Astro Flight Mighty Micro 010 direct drive motor and a carbon fiber transmission housing, and each has a mass of about 74 grams. Version 1 of the transmission 3a, shown in FIG. 12a, uses aluminum straight tooth gears and Rulon bushings. Version 2 of the transmission 3b uses smaller spiral tooth carbide gears and ball bearings. In the first version 3a, bulky propeller hubs did not allow for the two propellers 4a to be closely mounted. In the second version 3b, integrated propeller hubs put the propellers 4b less than one core length apart. These integrated propeller hubs can be seen especially in propeller sets 4e, 4g, and 4h in FIG. 11. Tests showed that the second transmission version produced more thrust over the entire range of input power. In other embodiments of the MAV of the present invention, two separate motors may provide power to two separate counter-rotating propellers. Typical placement for two counter-rotating propellers would be at the forebody of the MAV spaced apart from each other by a sufficient distance so as not to interfere with each other.

Figure 13:
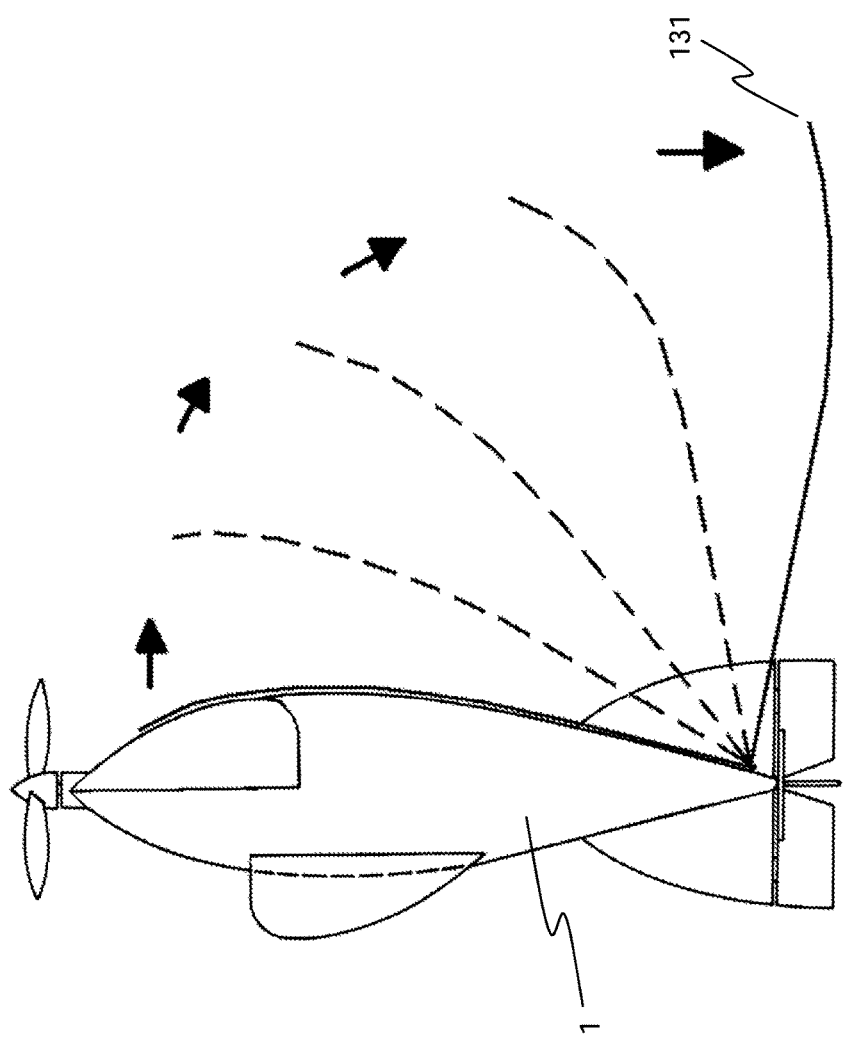
FIG. 13. Isometric side view of the MAV of the present invention showing appendages for unassisted vertical orientation of the MAV.

The ability to transition to flight unaided by physical help from a human operator and without having to rely on unpredictable environmental conditions (such as having a tall, clear platform from which to fall in order to use gravity to pick up airspeed) after having landed is a critical feature of a multi-mobility MAV in order to provide for its recovery and permit it to conduct multiple successive missions from different ground vantage points. The ability of the MAV to orient itself for vertical takeoff is therefore an important feature. In some embodiments the MAV 1 of the present invention may comprise a pair of contoured wire legs 131 that would lie along the bottom of the fuselage, as shown in FIG. 13. A single actuator would extend those legs to cause the vehicle to tail stand for vertical takeoff. This is accomplished even with a relatively weak actuator since the gross weight of the MAV is very small. Various modifications of this system are envisioned, wherein more or fewer legs are used, or legs of various shapes and configurations are used (such as a V-shaped wire actuated at its intersection rather than two separate wire legs). Also, more than one actuator could be used.

Figure 14:
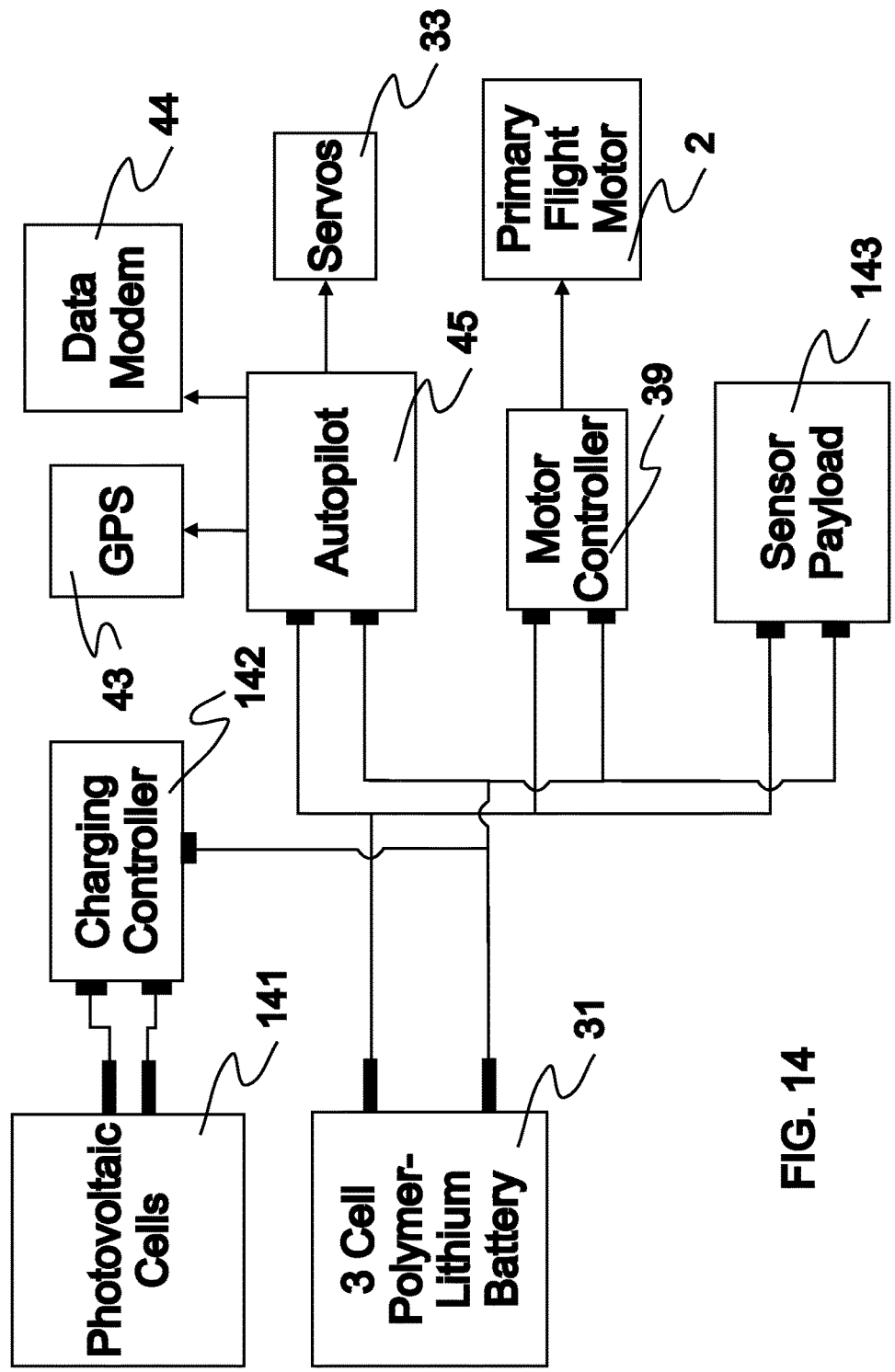
FIG. 14. Diagram of the electrical systems of the MAV of the present invention.

FIG. 14 illustrates the pathways of the electrical system for one embodiment of the MAV of the present invention. Preferably, the MAV possesses the ability to harvest its own energy to provide for longer and more flexible missions than traditional MAVs are capable of. Energy may be harvested from the sun by means of photovoltaic cells 141, for example, or from the wind by means of a wind turbine (not shown). In some cases the propeller blades may double as turbine blades while the MAV is at rest and may transfer energy to a generator (not shown) to replenish the battery 31. If the MAV has an additional water-based mode of motility the propellers may in similar fashion collect energy from currents of water going by the MAV while the MAV is docked or otherwise made stationary in a flowing body of water. In the illustrated diagram, photovoltaic cells 141 provide energy to a 3-cell polymer-lithium battery 31 as facilitated by a charging controller 142. Power is then provided to the navigation subsystem comprising the autopilot 45, the GPS 43, the data modem 44, and the servos 33 (which can include servos for moving both the flight control surfaces or also the hopper) and/or plasma actuators (not shown in FIG. 14); the flight power subsystem comprising the motor controller 39 and the primary flight motor 2; and the sensor payload subsystems comprising any cameras or other sensors, or any other payload subsystems as might be described herein or reasonably understood to be useful MAV payloads by a person skilled in the art.

More preferably, the solar energy harvesting apparatus and the energy storage apparatus are structurally integrated into the MAV. By structurally integrating solar energy harvesting and energy storage apparatuses, the multi-mode MAV can use its unique locomotion capabilities to perform extended perch and stare surveillance missions with self insertion, immediate aerial reconnaissance and extraction.

Preferably, in various embodiments of the present invention, photovoltaic cells and batteries are used as structural elements of the MAV. Traditional construction of MAVs have an airframe that is made from material the only function of which is structural in nature. The other components such as batteries and/or photovoltaic cells are then mounted inside or onto the air frame. The present invention instead contemplates using components that are normally mounted inside the airframe as aspects of the airframe itself. Using a component of the MAV's system as part of the airframe increases the mass efficiency of the vehicle. Weight is saved by eliminating the mono-use structure and replacing the structure with a component of the system that can serve both its primary use and a secondary use as some aspect of the structure. In the particular case for the multi-mode mobility MAV this is accomplished by creating a lamination of the battery chemistry and its packaging along with a layer of photovoltaic cells using, for example, an aluminum-polymer laminate film. This lamination of battery and photovoltaic cell are sufficiently strong and rigid to replace the upper structural skin of the airframe. This lamination is then also preferably used to create the winglets of the airframe and/or control surfaces. Thus, rather than three separate single use components (battery, photovoltaic, and structure) used in three separate locations of the MAV with each contributing weight, the present invention combines all three functions in one composite component of the system that serves all three functions with less weight than the three separate components.

Figure 15:
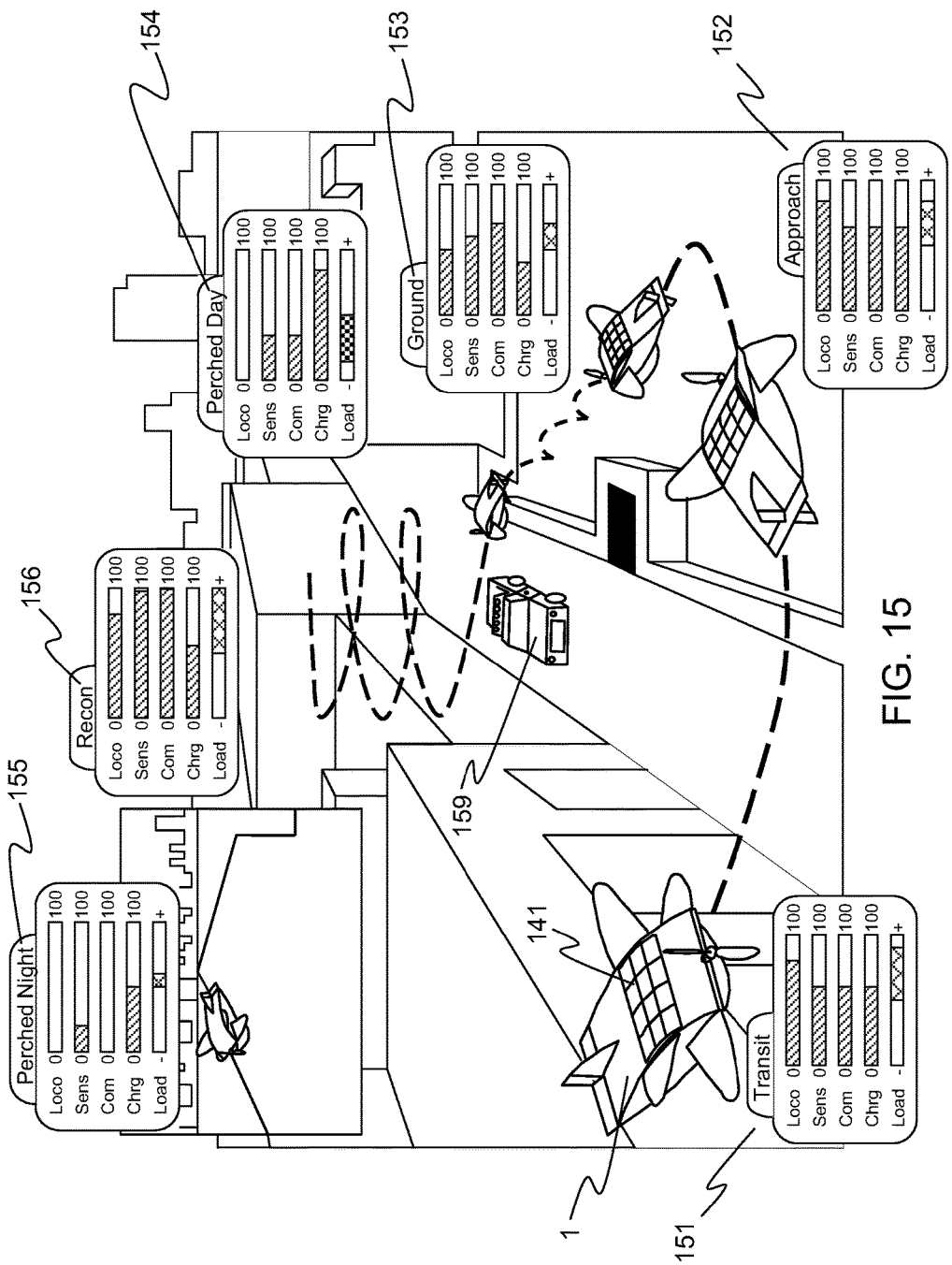
FIG. 15. Illustration of an exemplary perch-and-stare surveillance mission use of the MAV of the present invention showing relative power consumption of the various systems at various stages of energy harvesting.

FIG. 15 shows an exemplary perch-and-stare surveillance mission use of the MAV of the present invention showing relative power consumption of the various systems at various stages of energy harvesting. For example, after MAV 1 is launched, while it is in transit 151, locomotion consumes most of the MAV's energy, but sensors, communications and charging systems are also allotted electrical energy. On approach 152 to a landing point on a building roof, the amount of energy directed toward aerial locomotion goes up slightly as the MAV must navigate and slow its speed to reach its landing point. While on the ground 153 locomotion still consumes power as the MAV hops around to explore its surroundings and to optimally position itself at, for example, a building roof corner for its perch and star mission, and its communications systems may now require extra energy as the MAV transmits intelligence data, preferably including but not limited to video and audio, back to a home base. While perched 154, locomotion consumes no electrical energy and sensors and communications may require less energy as the MAV only senses and transmits on activity of interest. Its charging systems, on the other hand, are more active as the MAV harvests electrical energy via structurally-integrated photovoltaic cells 141 during the day. Thus the power expenditure load goes way down. At night 155 when solar energy is less available the load may go up again to accommodate the sensor subsystems. Finally, in the case that a target 159 is identified, the MAV may be activated to perform reconnaissance 156, in which case it launches itself either through vertical takeoff as previously described or by stepping off the edge of a multi-story building in order to pick up the airspeed required for flight. At this phase of the mission sensor and communication subsystems are most active in order to supply the intelligence demanded by the mission.

Thermal management is a major consideration during perch-and-stare operations or otherwise while idling, since batteries and energy harvesting systems operate sub-optimally when outside the range of normal operating temperatures. The MAV's own propulsion system can effectively double as a cooling system, operating at low speeds to pass air over the airframe of the MAV and cool the MAV.

Figure 16:
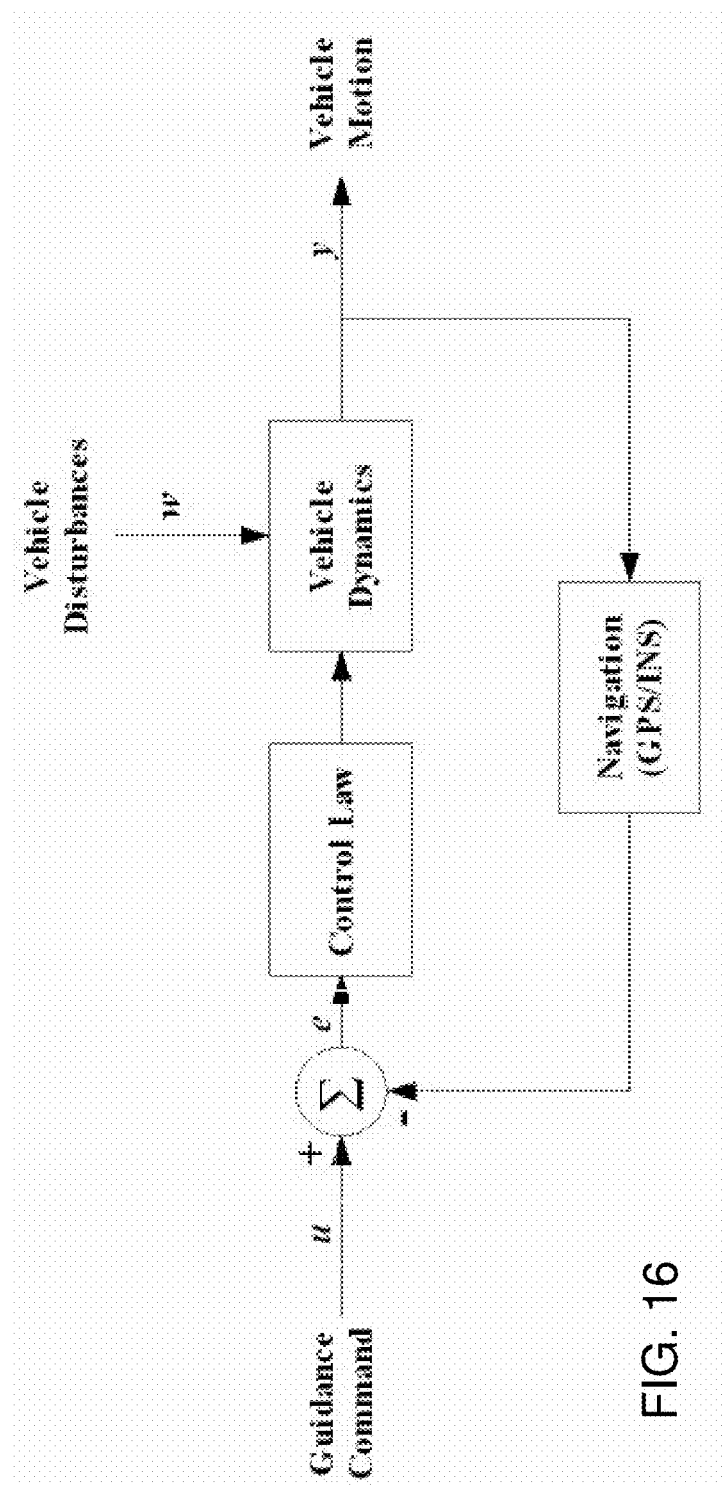
FIG. 16. Diagram of the feedback controller of the MAV of the present invention.
Figure 18:
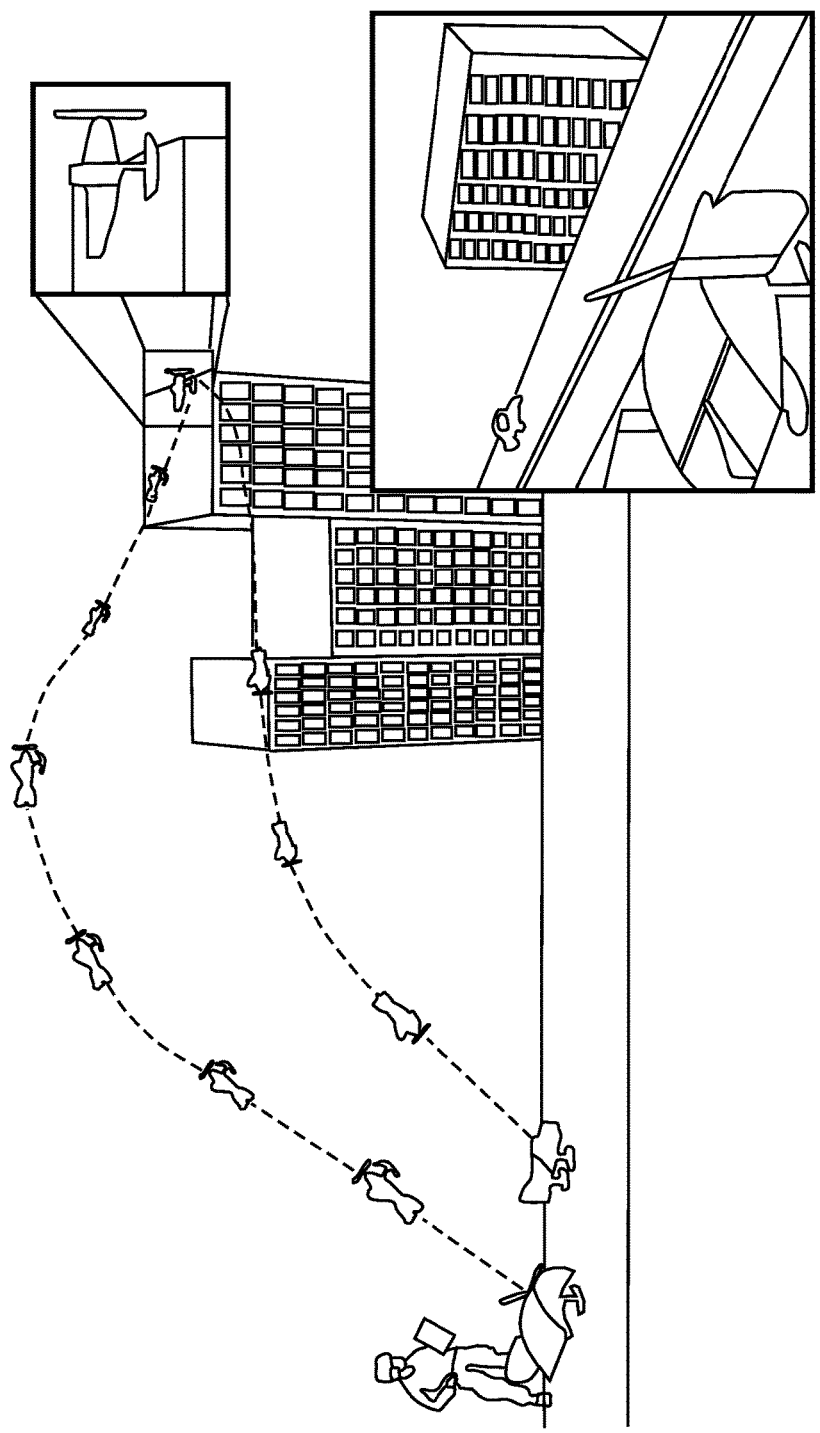
FIG. 18. Illustration of an exemplary perch-and-stare surveillance mission use of the MAV of the present invention.

Guidance, navigation, and control (GNC) of the MAV may be accomplished either remotely via a ground-based control system which communicates with the MAV via a wireless link, or autonomously using onboard systems, or some combination of both. The robustness and flexibility required of the control systems cannot be supplied by any fixed gain linear control scheme. A linear, adaptive, generalized predictive control (GPC) algorithm of the type described in U.S. Pat. No. 5,424,942, herein incorporated by reference, that has a small computational footprint, may be applied to the vehicle's inner control loop (FIG. 16). Alternatively, the system can use an adaptive nonlinear controller that guarantees global stability and asymptotic regulation for a large class of nonlinear problems through the technique of feedback domination or the technique of adding a power integrator and a novel separation principal to produce a dynamic compensator design that can adapt to changes in model parameterization, as long as the change is bounded (and this bound need not be explicitly known).

The base station for use with the MAV of the present invention can take a number of forms. In the simplest embodiments it may be a remote control similar to the type used by hobbyists which provides direct control of the actuation of the aerodynamic control surfaces and the hopper. In other embodiments it may take the form of a personal computer or similar device (PDA, smart phone, etc.) having a screen capable of showing flight parameters and sensor information (including a live video feed, if applicable) and providing commands to the MAV. The commands may be direct control surface or hopper controls, or more abstract commands processed by onboard navigation and control systems, such as "fly to these coordinates and land" or "loiter above this target."

The multi-mode mobility MAV can also provide a highly mobile radio repeater platform. The multi-mode locomotion enables access to locations not accessible to other UAV and UGV systems in order to take cover or provide more communications in environments and zones not amenable to wireless communications, e.g., mountainous zones or urban zones where structures may interfere with signal reception. The integrated energy harvesting system allows for extended missions. The re-launch capability allows for redeployment as needed. In an exemplary mission scenario, as illustrated in FIG. 19, hostile forces have destroyed communications infrastructure, disrupting command and control amongst friendly forces. One or more MAVs 1 acting as flying communications platforms are dispatched and fly to the best landing spot(s). Each acts as a communications node to restore communications network integrity and redundancy. Each MAV cooperates with other network nodes which may be other MAVs, other deployed unmanned vehicles acting as radio repeater nodes 191, mobile manned communications repeaters, or existing operational portions of the ground-based wireless communications infrastructure. When any portion of the network is destroyed 192, a MAV 1 may resume flight and respond instantly to rapidly heal damaged networks, quickly establishing communications links to other subnetworks. Preferably, each MAV harvests its own energy to provide for the longest mission duration.

Figure 20:
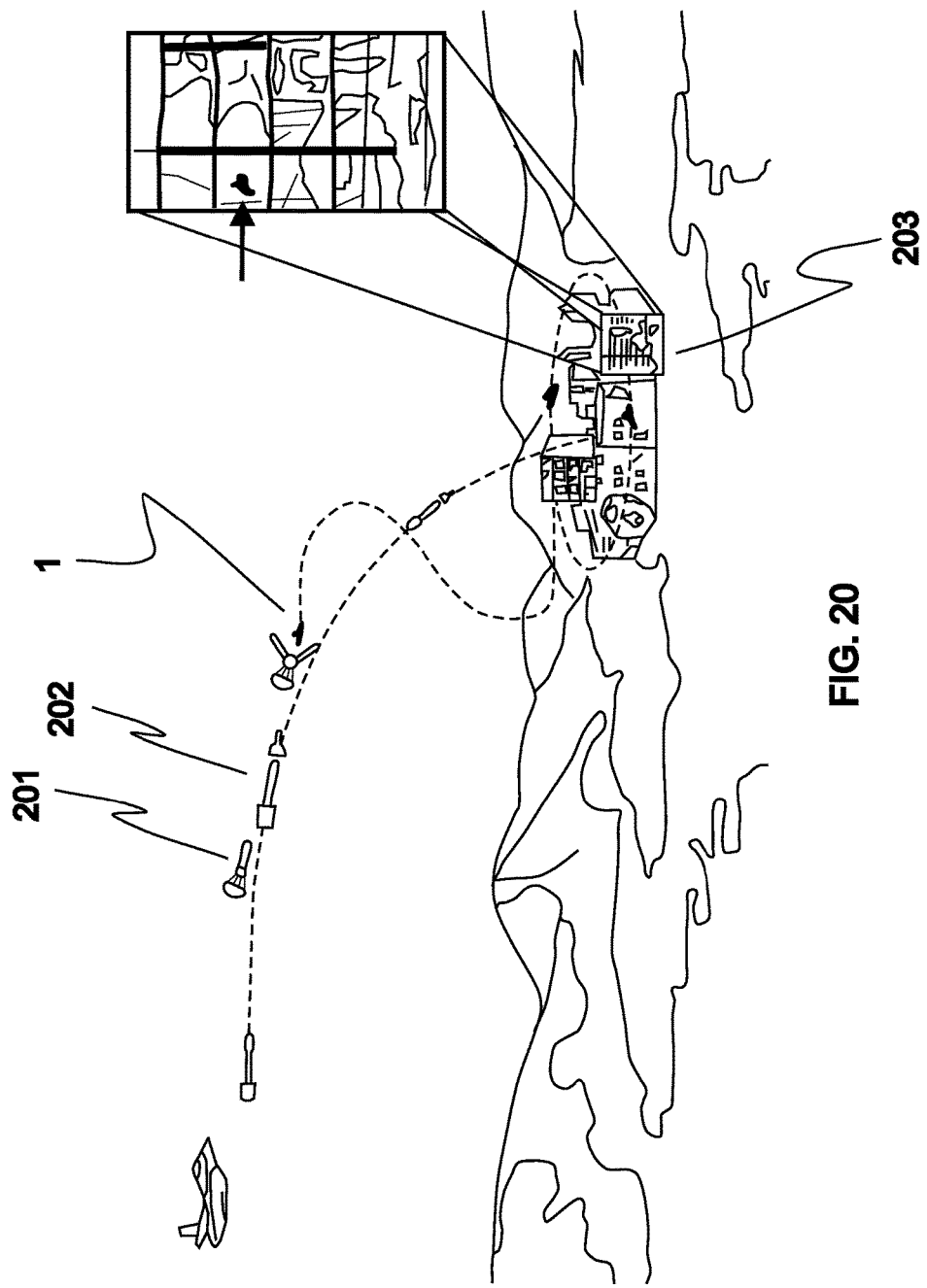
FIG. 20. Illustration of an exemplary bomb impact assessment mission use of the MAV of the present invention.
Figure 21:
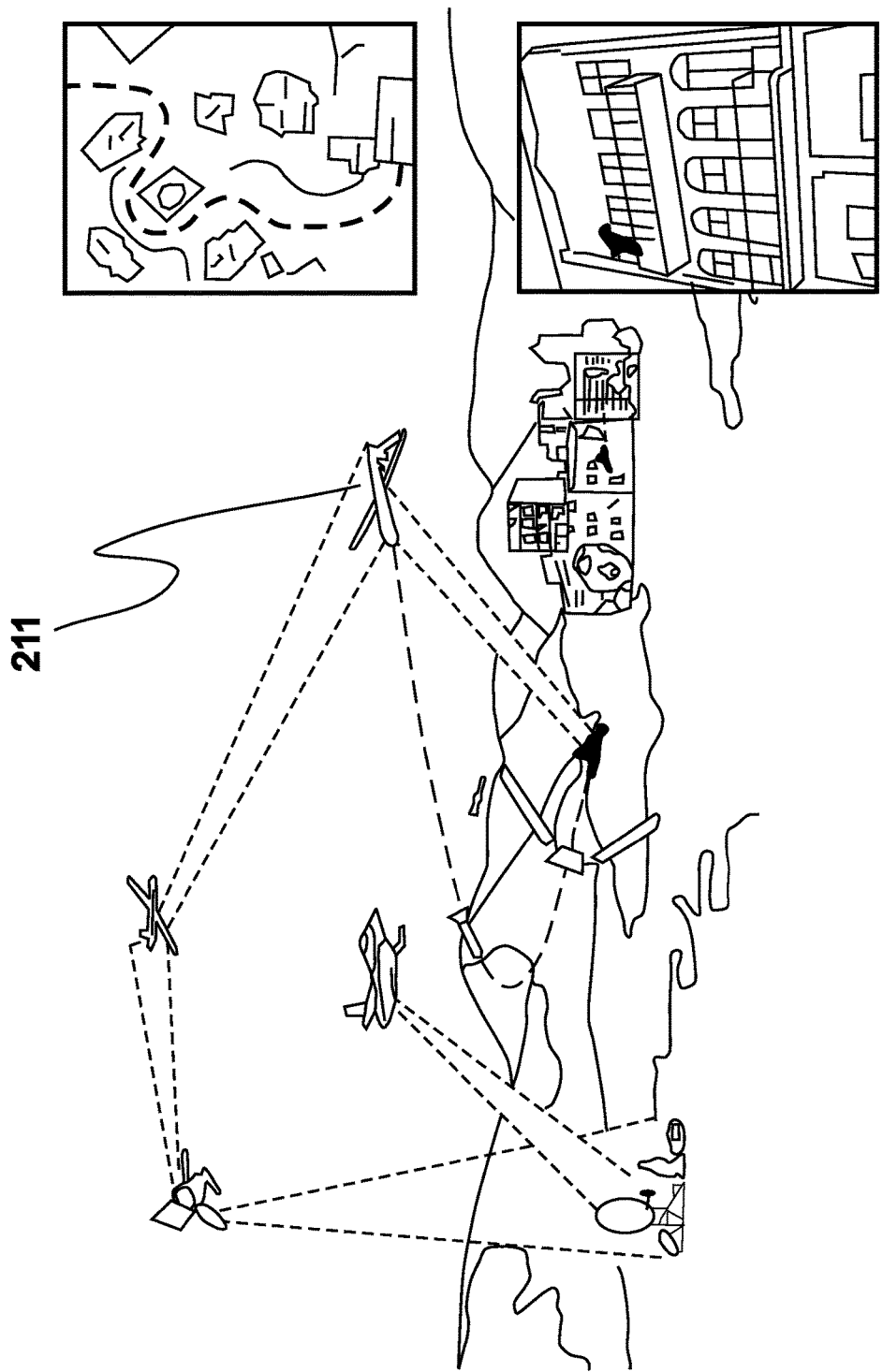
FIG. 21. Illustration of an exemplary bomb impact assessment mission use of the MAV of the present invention.

As shown in FIGS. 20-21, another contemplated use of the multi-mode mobility MAV of the present invention is for bomb impact assessment (BIA). The BIA MAV 1 may be enclosed in a sabot 201 launched along with missile or munition 202, or alternately may simply be dropped or launched from an aircraft such as a fighter jet, bomber or drone 211 that has either fired the missile or munition or that is simply already near the target 203. Once near the target area 203, the sabot is deployed from the missile or munition, preferably with a drag device such as a parachute or streamer to slow the MAV-containing sabot 201. The missile or munition proceeds to attack the target 203 while the BIA MAV is deployed from the sabot and descends upon the target post-attack. The MAV may then morph for low-speed intelligence gathering, flying around the target after bomb impact and landing and transitioning to ground locomotion on top of and inside of structures as necessary to collect and transmit pictures or video, providing views of the target that cannot be achieved with satellite imagery. In this way, bomb impact assessment may be performed automatically and instantaneously following the attack to relay information about the precise status of the target's destruction.

Preferably, the MAV of the present invention further incorporates an autonomous flight response to evade capture in the event of hostile discovery while idling. This flight response may be stimulated by processing of any number and type of sensor signals using any means known in the art. For example, while the MAV is perched on a rooftop, an accelerometer may detect vibrations characteristic of approaching footsteps, a video camera may detect a looming body or face, a microphone may detect intensifying human speech or other sounds indicative of human approach, or an infrared motion detector may detect nearby motion, any of which may signal imminent hostile capture of the MAV and may trigger the autonomous flight response, which would direct the MAV to immediately initiate vertical takeoff or, if vertical takeoff is obstructed or otherwise unfeasible, to hop away either to take cover or to assume a position or orientation more favorable for vertical takeoff. For similar purposes the MAV may also carry a secondary payload of a surprise inducer or deterrent such as a small flare, firecracker, smoke bomb, stink bomb, pepper spray squirter, etc. which could be activated if any capture detection systems (such as those listed above) detected particularly proximate hostile capture. Finally, if capture is recognized as being unavoidable (e.g., if the MAV detects that it has already been immobilized and the triggering of any surprise inducer does not succeed in freeing the MAV), it may be advantageous to initiate a memory wipe or other type of self-destruct to prevent collected sensor data or communications information from falling into hostile hands, and the MAV could be equipped to automatically initiate such a process upon detection of capture or imminent capture.

Figure 22:
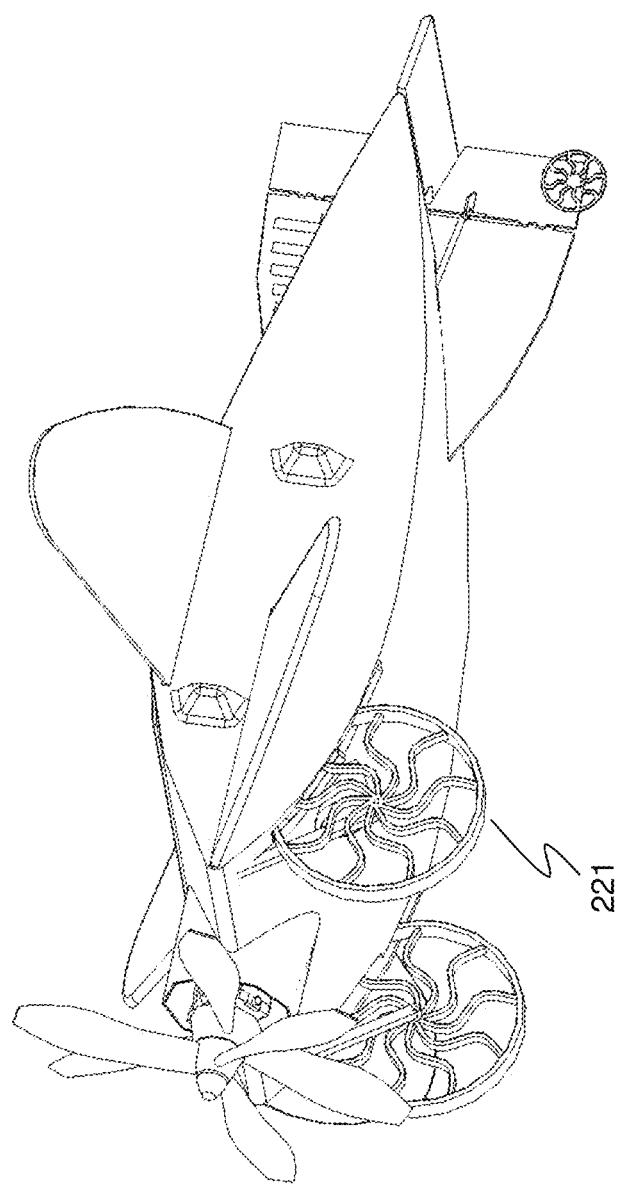
FIG. 22. Ventral perspective view of a wheeled embodiment of the MAV of the present invention.

Other forms of multi-mode mobility are also contemplated as being within the scope of the present invention. For example, rather than (or in addition to) hopping on land, in some embodiments the MAV of the present invention may have water modes of mobility in which the MAV lands in water and floats, or buoyantly sinks and travels submersibly. The aerodynamic propulsion system could double as a water propulsion system, or the MAV could comprise a secondary propulsion system for water travel, either propeller/screw-based or jet-based, or based on any other water propulsion system known in the art. Properly camouflaged, the MAV could go unnoticed, taken only for a piece of detritus or a water bird. Also advantageously, the MAV could land in a flowing body of water such as a river, stream, or aqueduct and utilize the flow of the water to travel to an intended destination with very little energy expenditure, relying on its own mobility systems solely to avoid obstacles or become unstuck from them for the duration of water-based travel. Once near a destination, the MAV could vertically takeoff from the water and proceed by air to its next target. In this way, the range of the MAV could be greatly extended without significantly adding to its power requirements. As discussed previously in this application, in some embodiments of the present invention, one or more wheels 221 are either built into the foot or located elsewhere on the underside of the MAV body, as illustrated in FIG. 22. The wheel(s) may be motorized or unmotorized. If motorized, the MAV could drive the wheel or wheels to produce ground locomotion, and if unmotorized, the MAV could rely on its propeller(s) to propel itself on the wheel(s) to produce rolling ground locomotion. Properly braked, the wheels themselves may also serve as the hopping feet (or a single wheel as a hopping foot) such that the MAV could roll when desirable and hop when desirable. However, in such a case, the hopping foot might not be stable as discussed earlier since the selection of the curvature of the underside of the hopping foot is critical to preserving such stability as shown in FIG. 5. In the embodiment illustrated in FIG. 22, the springiness of the wheel spokes is preferably selected to permit for the appropriate hopping movement.

In certain embodiments the MAV could also be equipped with one or more tail hooks or grasping claws instead of or in addition to its hopping foot, permitting it to attach to and hang from tree branches or power transmission lines. In such a case, the MAV's energy harvesting system could comprise apparatus for inductively harvesting power from power transmission lines, or from other systems such as air conditioning units. While many other MAV systems require high airspeed for sustained flight, the capability of the MAV of the present invention for slower flight could, if appropriately coupled to sensors and processing means for collision detection and avoidance, permit it to navigate forest or urban environments, flying by weaving between trees or tall buildings, in order to reconnoiter foliage-covered areas impermeable to satellite imaging systems or populated urban environments, or to travel under the cover of foliage or amidst buildings to better avoid aerial detection.

Numerous other applications of the MAV of the present invention are also envisioned. A swarm or flock of multiple MAVs could be used for detection of chemical cloud or radioactive cloud attack or for investigation of volcanic clouds to test the safety of air travel in the vicinity of a volcanic eruption. In any of these cases the MAVs would be equipped with sensors for detecting the airborne agent of interest and would either fly to or be aerially released near the target site. The MAVs would then communicate with each other to coordinate their flight paths in order to ascertain the boundary of the dangerous cloud, its speed and direction of travel, and its dispersal concentration to determine the risk imposed by the cloud. Similar uses are envisioned for investigation of meteorological phenomena such as storms, hurricanes or tornadoes, wherein swarms or flocks of MAVs collect and report weather data.

It is envisioned that by virtue of its low size and weight, the MAV of the present invention could be included in the survival pack of a downed pilot/aircrew member or a stranded seaman or the like. It could then be periodically deployed to survey routes of travel, track and evade the enemy, provide a visual marker for rescue operations, or provide a communications repeater to enhance the chances of communication with rescue operations.

Another envisioned application of the MAV of the present invention is as a communications disruption system. A MAV's communications payload could be equipped to generate white noise or other disruptive signals to interfere with the wireless communications systems of an enemy. The effectiveness of this operation could be enhanced by the deployment of multiple such MAVs. The MAVs could perch near terrestrial communications infrastructure such as antennas or satellite dishes in order to best jam them or feed them with bogus signals, which could include signals that have been intercepted and modified for content. Alternatively, the MAVs could be equipped to generate an electromagnetic pulse that would be disabling of communications equipment, computers or power systems, even if such a pulse would disable the delivery MAV. While weight limitations of the MAV do not in the typical case make it an optimal delivery method for explosive payloads, use of the MAV as an explosive weapon, or as a delivery and aiming means of a projectile weapon, should be seen as within the scope of the invention.

In another embodiment, the MAV of the present invention could be configured for delivery as part of the payload of a munition. The MAV would be separated or released from the explosive payload of the munition just prior to, but at a safe distance from, target impact, such that the MAV could conduct investigation of the impact site for battle damage assessment, providing intelligence not collectable by satellite imaging by virtue of the MAV's ability to collect imaging views from lower angles and even to land and collect ground angle views using terrestrial modes of mobility. The MAV could approach individual casualties for visual or aural confirmation of their identities and their statuses (fatality, injury, unharmed, etc.). Such an application would greatly enhance the speed and accuracy and reduce the cost of post-attack intelligence operations to determine, for example, if a high-value target was successfully terminated or not. In such an embodiment the airframe of the MAV could preferably be made substantially cylindrical so as to fit within a stage of the munition and could be equipped with unfolding wings. The payloads and operative systems of the MAV would be hardened to survive firing/launch.

The multi-mode mobility MAV of the present invention could further incorporate a high-energy explosive to double as a micro aerial weapon (MAW). After covert insertion and extended perch-and-stare operation, if a threat is identified, the MAW could then take off and fly to terminally guide itself to the target and deliver a lethal attack.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A multi-mode mobility micro air vehicle (MAV) self-containedly comprising:
    an aerodynamic body capable of flight, the surface of the aerodynamic body having aerodynamic controls;
    an aerodynamic propulsion system; and
    at least one retractable leg adapted to deploy from an initial position enclosed within the aerodynamic body, and thereafter cyclically extend and contract under power to effect a directed hopping motion in conjunction with the aerodynamic propulsion system and the aerodynamic controls
    wherein the multi-mode mobility MAV is capable of flying, safely landing, and hopping to a new orientation or position on the retractable leg.

2. The MAV of claim 1, wherein the MAV is less than 600 grams in mass.

3. The MAV of claim 1, wherein the MAV fits into a cubic volume no more than 16 inches in any dimension without disassembly.

4. The MAV of claim 1, wherein the MAV is capable of flying for at least 90 minutes.

5. The MAV of claim 1, wherein the MAV is further capable of unaided vertical takeoff and resumption of flight after safely landing.

6. The MAV of claim 1, wherein the aerodynamic propulsion system comprises coaxial contra-rotating propellers.

7. The MAV of claim 1, wherein the aerodynamic controls comprise plasma actuators.

8. The MAV of claim 1, wherein the MAV's navigation is at least in part controlled by an adaptive predictive feedback controller.

9. The MAV of claim 5, wherein a system enabling vertical takeoff comprises one or more rigid appendages actuated to stay up against or within the aerodynamic body during locomotion, and while the MAV is stationary with respect to a ground surface, actuated to extend outwardly from the aerodynamic body to press against the ground surface, inclining the aerodynamic body upward during preparation for vertical takeoff.

10. A method of terrestrially locomoting a flying sensor platform comprising:
   landing the flying sensor platform on a ground surface;
   hopping the flying sensor platform on at least one retractable leg;
   while hopping, simultaneously moving the flying sensor platform forward via an aerodynamic propulsion system; and
   while hopping, simultaneously orienting the flying sensor platform via aerodynamic controls.

11. The method of claim 10, further comprising the step of taking off vertically and resuming flight after the steps of landing, hopping, moving forward and orienting the sensor platform.

12. The method of claim 10, wherein the aerodynamic propulsion system comprises coaxial contra-rotating propellers.

13. The method of claim 10, wherein the aerodynamic controls comprise plasma actuators.

14. The method of claim 10, further comprising the step of idling and generating electrical power via photovoltaic cells structurally integrated into the flying sensor platform after the steps of landing, hopping, moving forward and orienting.

15. The method of claim 11, further comprising the steps of the flying sensor platform approaching and circling a target of interest and wirelessly transmitting pictures or video while in close proximity to the target.

16. A statically and passively dynamically stable hopping leg for terrestrial locomotion of a micro air vehicle (MAV), flying sensor platform (FSP) or flying communication platform (FCP) having a body or airframe, the hopping leg comprising:
   a foot having an underside and atop side, the underside having a convex curvature such that, when fully deployed from a micro air vehicle or flying sensor or communications platform, the center of curvature of the foot is higher than the center of mass of the MAV, FSP or FCP, and the top side being connected to
   a rigid output link, the output link being connected to a lower link and an upper link, each of the lower link and the upper link being attached to
   a rigid frame, which also holds one or more rotating cams, wherein the rotation of the one or more rotating cams is transferred into a hopping motion of the output link; and
   wherein the hopping leg is retractable into the body or airframe of the MAV, FSP or FCP such that the foot retracts to be flush with or adjacent to the body or airframe and completely closes off the body or airframe.

17. The hopping leg of claim 16 wherein the foot has a curvature that is dynamically matched to the mass moment of inertia of the MAV/FSP/FCP.

18. The hopping leg of claim 16 wherein a rotary actuator drives the one or more rotating cams that are used to excite a hopping motion and extend and retract the leg into the MAV/FSP/FCP's body or airframe.

19. The hopping leg of claim 16 wherein a series arrangement of an actuator and a spring creates a driver for a harmonic hopping motion produced by the hopping leg.

20. The hopping leg of claim 16 wherein the links and rigid frame constitute a four-bar mechanism, and one or more links of the four-bar mechanism act as both a kinematic link and a spring element of the mechanism.

* * * * *